(12) United States Patent
Hattori et al.

(10) Patent No.: US 11,674,004 B2
(45) Date of Patent: Jun. 13, 2023

(54) LAMINATED FILM, OPTICAL ELEMENT, AND IMAGE DISPLAY

(71) Applicant: Nitto Denko Corporation, Ibaraki (JP)

(72) Inventors: Daisuke Hattori, Ibaraki (JP); Hiromoto Haruta, Ibaraki (JP); Kozo Nakamura, Ibaraki (JP); Hiroyuki Takemoto, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 109 days.

(21) Appl. No.: 15/749,148

(22) PCT Filed: Jul. 29, 2016

(86) PCT No.: PCT/JP2016/072418
§ 371 (c)(1),
(2) Date: Jan. 31, 2018

(87) PCT Pub. No.: WO2017/022691
PCT Pub. Date: Feb. 9, 2017

(65) Prior Publication Data
US 2018/0223061 A1    Aug. 9, 2018

(30) Foreign Application Priority Data

Jul. 31, 2015 (JP) .............................. JP2015-152971
Sep. 7, 2015 (JP) .............................. JP2015-176209
Jul. 28, 2016 (JP) .............................. JP2016-149061

(51) Int. Cl.
*C08J 3/24* (2006.01)
*B32B 5/18* (2006.01)
(Continued)

(52) U.S. Cl.
CPC ................. *C08J 3/243* (2013.01); *B32B 5/18* (2013.01); *B32B 27/16* (2013.01); *C08J 3/24* (2013.01);
(Continued)

(58) Field of Classification Search
CPC ... C08J 7/0427; C08J 3/24; C08J 3/243; C08J 3/244; C08J 2367/02; C08J 2483/04; B32B 5/18; B32B 27/16; G02B 1/04
See application file for complete search history.

(56) References Cited

U.S. PATENT DOCUMENTS 2,870,109 A    1/1959  Nickerson
4,408,009 A   10/1983  Mallon
(Continued)

FOREIGN PATENT DOCUMENTS

CN    1032503 A    4/1989
CN    1221629 A    7/1999
(Continued)

OTHER PUBLICATIONS

English translation of JP2014-046518. (Year: 2014).*
(Continued)

*Primary Examiner* — Robert S Walters, Jr.
(74) *Attorney, Agent, or Firm* — WHDA, LLP

(57) ABSTRACT

The present invention is intended to provide a laminated film including a void-provided layer achieving both a high proportion of void space and a high film strength. The laminated film of the present invention includes a void-provided layer 21 and a resin film 10, the void-provided layer 21 being stacked on the resin film 10. The laminated film is produced by a production method, including steps of forming a void-provided structure 20', which is a precursor of the void-provided layer 21 on the resin film; and causing a crosslinking reaction in the precursor 20' after the precursor (Continued)

forming step. The precursor 20' contains a substance that generates a basic substance by light irradiation or heating, the basic substance is not generated in the precursor forming step, the basic substance is generated by light irradiation or heating in the crosslinking reaction step, and the crosslinking reaction step has multiple stages.

15 Claims, 3 Drawing Sheets

(51) Int. Cl.
  *B32B 27/16* (2006.01)
  *G02B 1/04* (2006.01)
  *C08J 7/04* (2020.01)
  *C08J 7/043* (2020.01)
  *C08J 7/046* (2020.01)

(52) U.S. Cl.
  CPC ............... *C08J 3/244* (2013.01); *C08J 7/043* (2020.01); *C08J 7/046* (2020.01); *C08J 7/0427* (2020.01); *G02B 1/04* (2013.01); *C08J 2367/02* (2013.01); *C08J 2483/04* (2013.01)

(56) References Cited

U.S. PATENT DOCUMENTS

| | | | |
|---|---|---|---|
| 5,124,188 A | 6/1992 | Roe et al. | |
| 5,676,938 A | 10/1997 | Kimura et al. | |
| 5,844,060 A | 12/1998 | Furuya et al. | |
| 5,948,314 A | 9/1999 | Geiss et al. | |
| 5,948,482 A | 9/1999 | Brinker et al. | |
| 6,251,523 B1 | 6/2001 | Takahashi et al. | |
| 6,265,516 B1 | 7/2001 | Okawa et al. | |
| 6,300,385 B1 | 10/2001 | Hashida et al. | |
| 7,960,029 B2 | 6/2011 | Kai et al. | |
| 8,124,224 B2 | 2/2012 | Kato et al. | |
| 8,488,082 B2 | 7/2013 | Nishiguchi et al. | |
| 10,472,483 B2 | 11/2019 | Haruta et al. | |
| 2001/0003358 A1 | 6/2001 | Terase et al. | |
| 2003/0023021 A1 | 1/2003 | Sakuma | |
| 2003/0134124 A1 | 7/2003 | Ochiai | |
| 2004/0114248 A1 | 6/2004 | Hokazono et al. | |
| 2004/0132846 A1* | 7/2004 | Leventis | C08G 18/3895 521/99 |
| 2004/0216641 A1 | 11/2004 | Hamada et al. | |
| 2004/0253427 A1 | 12/2004 | Yokogawa et al. | |
| 2005/0038137 A1 | 2/2005 | Yoshihara et al. | |
| 2005/0162743 A1 | 7/2005 | Yano et al. | |
| 2005/0165197 A1 | 7/2005 | Ogihara et al. | |
| 2005/0195486 A1 | 9/2005 | Sasaki et al. | |
| 2006/0093786 A1 | 5/2006 | Ohashi et al. | |
| 2006/0164740 A1 | 7/2006 | Sone et al. | |
| 2006/0239886 A1 | 10/2006 | Nakayama et al. | |
| 2006/0269724 A1 | 11/2006 | Ohashi et al. | |
| 2006/0269733 A1 | 11/2006 | Mizuno et al. | |
| 2006/0281828 A1 | 12/2006 | Nakayama et al. | |
| 2007/0196667 A1 | 8/2007 | Asai | |
| 2007/0206283 A1 | 9/2007 | Ohtani et al. | |
| 2007/0248828 A1 | 10/2007 | Yoneyama et al. | |
| 2008/0075895 A1 | 3/2008 | Yamaki et al. | |
| 2008/0171188 A1 | 7/2008 | Van Baak et al. | |
| 2008/0290472 A1 | 11/2008 | Yagihashi et al. | |
| 2008/0311398 A1* | 12/2008 | Bauer | C09D 11/03 428/402 |
| 2008/0316602 A1 | 12/2008 | Kameshima et al. | |
| 2009/0202802 A1 | 8/2009 | Seong et al. | |
| 2009/0244709 A1 | 10/2009 | Suzuki et al. | |
| 2010/0102251 A1 | 4/2010 | Ferrini et al. | |
| 2010/0160577 A1 | 6/2010 | Hirano | |
| 2010/0246014 A1 | 9/2010 | Asahi et al. | |
| 2010/0256321 A1 | 10/2010 | Kim et al. | |
| 2011/0033398 A1 | 2/2011 | Cauvin et al. | |
| 2011/0195239 A1 | 8/2011 | Takane et al. | |
| 2011/0224308 A1 | 9/2011 | Saito et al. | |
| 2012/0038990 A1 | 2/2012 | Hao et al. | |
| 2013/0202867 A1 | 8/2013 | Coggio et al. | |
| 2013/0265477 A1 | 10/2013 | Furusato et al. | |
| 2013/0337161 A1 | 12/2013 | Akimoto et al. | |
| 2014/0009835 A1 | 1/2014 | Shibuya et al. | |
| 2014/0371317 A1 | 12/2014 | Aliyar et al. | |
| 2015/0037535 A1 | 2/2015 | Akimoto et al. | |
| 2015/0037605 A1 | 2/2015 | Oser et al. | |
| 2015/0166353 A1 | 6/2015 | Kobayashi et al. | |
| 2016/0025899 A1 | 1/2016 | Ishizeki et al. | |
| 2016/0131819 A1 | 5/2016 | Musashi et al. | |
| 2016/0170094 A1 | 6/2016 | Nakayama et al. | |
| 2016/0194451 A1 | 7/2016 | Koshida et al. | |
| 2016/0304722 A1 | 10/2016 | Kobori | |
| 2017/0183542 A1 | 6/2017 | Kato et al. | |
| 2017/0341336 A1 | 11/2017 | Haruta et al. | |
| 2017/0342232 A1* | 11/2017 | Haruta | C08J 9/28 |
| 2018/0002508 A1* | 1/2018 | Hattori | C08J 7/054 |
| 2018/0215124 A1 | 8/2018 | Hattori et al. | |
| 2018/0223061 A1 | 8/2018 | Hattori et al. | |
| 2018/0224580 A1 | 8/2018 | Hattori et al. | |

FOREIGN PATENT DOCUMENTS

| | | |
|---|---|---|
| CN | 1256381 A | 6/2000 |
| CN | 1275589 A | 12/2000 |
| CN | 1544324 A | 11/2004 |
| CN | 1646947 A | 7/2005 |
| CN | 1809764 A | 7/2006 |
| CN | 1842727 A | 10/2006 |
| CN | 101007911 A | 8/2007 |
| CN | 101128752 A | 2/2008 |
| CN | 101792529 A | 8/2010 |
| CN | 102186668 A | 9/2011 |
| CN | 102460244 A | 5/2012 |
| CN | 102712140 A | 10/2012 |
| CN | 102736135 A | 10/2012 |
| CN | 103168257 A | 6/2013 |
| CN | 103185905 A | 7/2013 |
| CN | 103213996 A | 7/2013 |
| CN | 103660513 A | 3/2014 |
| CN | 103738971 A | 4/2014 |
| EP | 1031612 A2 | 2/1999 |
| EP | 3 235 638 A1 | 10/2017 |
| EP | 3239221 A1 | 11/2017 |
| EP | 3239257 A1 | 11/2017 |
| EP | 3246355 A1 | 11/2017 |
| JP | 61-250032 A | 11/1986 |
| JP | 5-506681 A | 9/1993 |
| JP | H07-48527 A | 2/1995 |
| JP | H07-133105 A | 5/1995 |
| JP | 9-24575 A | 1/1997 |
| JP | H10-158012 A | 6/1998 |
| JP | H10-508049 A | 8/1998 |
| JP | H11-292568 A | 10/1999 |
| JP | 2000-119433 A | 4/2000 |
| JP | 2000-256040 A | 9/2000 |
| JP | 2000-264620 A | 9/2000 |
| JP | 2000-284102 A | 10/2000 |
| JP | 2001-163613 A | 6/2001 |
| JP | 2002-311204 A | 10/2002 |
| JP | 2003-216061 A | 7/2003 |
| JP | 2004-10424 A | 1/2004 |
| JP | 2004-300172 A | 10/2004 |
| JP | 2004-323752 A | 11/2004 |
| JP | 2004-354699 A | 12/2004 |
| JP | 2005-015308 A | 1/2005 |
| JP | 2005-148623 A | 6/2005 |
| JP | 2005-154195 A | 6/2005 |
| JP | 2005-350519 A | 12/2005 |
| JP | 2006-11175 A | 1/2006 |
| JP | 2006-96019 A | 4/2006 |
| JP | 2006-96967 A | 4/2006 |
| JP | 2006-221144 A | 8/2006 |
| JP | 2006-255496 A | 9/2006 |
| JP | 2006-297329 A | 11/2006 |
| JP | 2007-014946 A | 1/2007 |
| JP | 2008-40171 A | 2/2008 |

(56) References Cited

FOREIGN PATENT DOCUMENTS

| | | |
|---|---|---|
| JP | 2008-205008 A | 9/2008 |
| JP | 2008-214569 A | 9/2008 |
| JP | 2008-291074 A | 12/2008 |
| JP | 2009-503226 A | 1/2009 |
| JP | 2009-258711 A | 11/2009 |
| JP | 2010-256880 A | 11/2010 |
| JP | 2012-91943 A | 5/2012 |
| JP | 2012-189802 A | 10/2012 |
| JP | 2012-524299 A | 10/2012 |
| JP | 2012-228878 A | 11/2012 |
| JP | 2013-7831 A | 1/2013 |
| JP | 2013-60309 A | 4/2013 |
| JP | 2013-083722 A | 5/2013 |
| JP | 2014-46518 A | 3/2014 |
| JP | 2014-122309 A | 7/2014 |
| JP | 2015-028540 A | 2/2015 |
| JP | 2015-064607 A | 4/2015 |
| JP | 2016-104551 A | 6/2016 |
| KR | 10-2003-0040065 A | 5/2003 |
| KR | 10-2004-0044532 A | 5/2004 |
| KR | 10-2007-0011303 A | 1/2007 |
| KR | 10-2007-0022059 A | 2/2007 |
| KR | 10-2009-0006784 A | 1/2009 |
| KR | 10-2014-0103175 A | 8/2014 |
| TW | 213860 B | 10/1993 |
| TW | 200300157 A | 5/2003 |
| TW | 200844194 A | 11/2008 |
| TW | 201447389 A | 12/2014 |
| TW | 201447402 A | 12/2014 |
| WO | 2010/120845 A2 | 10/2010 |
| WO | 2010/120971 A1 | 10/2010 |
| WO | 2011/088161 A1 | 7/2011 |
| WO | 2012/115057 A1 | 8/2012 |
| WO | 2012/124693 A1 | 9/2012 |
| WO | 2014/034588 A1 | 3/2014 |
| WO | 2014/175124 A1 | 10/2014 |
| WO | 2015/041257 A1 | 3/2015 |
| WO | WO-2016104762 A1 * | 6/2016 ............ C08G 77/44 |

OTHER PUBLICATIONS

Kim et al. "Photopatterned Nanoporous Media" Nano Lett. vol 4, No. 7, 2004 (Year: 2004).*

Yildirim et al.,"Template free preparation of nanoporous organically modified silica thin films on flexible substrates", Journal of Materials Chemistry, 2011, 21, pp. 14830-14837, cited in Specification of PCT/JP2015/086364, PCT/JP2015/086365 and PCT/JP2016/072452. (8 pages).

Adachi et al., "Preparation of the Silica Gel Monolith by the Sol-Gel Method Using N, N-Dimethylformamide and the Vitrification of the Gel", Yogyo-Kyokai-Shi, 1987, 95, pp. 970-975, cited in Specification of PCT/JP2015/086362 and PCT/JP2015/086363. (6 pages).

International Search Report dated Mar. 8, 2016, issued in International Application No. PCT/JP2015/086362 (counterpart of U.S. Appl. No. 15/539,926). (2 pages).

International Search Report dated Mar. 8, 2016, issued in International Application No. PCT/JP2015/086363 (counterpart of U.S. Appl. No. 15/539,946). (2 pages).

International Search Report dated Apr. 12, 2016, issued in International Application No. PCT/JP2015/086364 (counterpart of U.S. Appl. No. 15/539,928). (1 page).

International Search Report dated Mar. 29, 2016, issued in International Application No. PCT/JP2015/086365 (counterpart of U.S. Appl. No. 15/539,927). (2 pages).

International Search Report dated Nov. 8, 2016, issued in International Application No. PCT/JP2016/072417 (counterpart of U.S. Appl. No. 15/749,250). (2 pages).

International Search Report dated Nov. 8, 2016, issued in International Application No. PCT/JP2016/072418 (counterpart of U.S. Appl. No. 15/749,148). (3 pages).

International Search Report dated Nov. 8, 2016, issued in International Application No. PCT/JP2016/072452 (counterpart of U.S. Appl. No. 15/754,406). (2 pages).

International Preliminary Report on Patentability (Form PCT/IB/373) dated Jun. 27, 2017 of International Application No. PCT/JP2015/086365(counterpart of U.S. Appl. No. 15/539,927), with Form PCT/ISA/237. (8 pages).

International Preliminary Report on Patentability (Form PCT/IB/373) dated Jun. 27, 2017 of International Application No. PCT/JP2015/086364(counterpart of U.S. Appl. No. 15/539,928), with Form PCT/ISA/237. (11 pages).

International Preliminary Report on Patentability (Form PCT/IB/373) dated Jun. 27, 2017 of International Application No. PCT/JP2015/086363(counterpart of U.S. Appl. No. 15/539,946), with Form PCT/ISA/237. (10 pages).

International Preliminary Report on Patentability (Form PCT/IB/373) dated Jun. 27, 2017 of International Application No. PCT/JP2015/086362(counterpart of U.S. Appl. No. 15/539,926), with Form PCT/ISA/237. (8pages).

International Preliminary Report on Patentability (Form PCT/IB/373) dated Feb. 6, 2018 of International Application No. PCT/JP2016/072418(counterpart of U.S. Appl. No. 15/749,148), with Form PCT/ISA/237. (19 pages).

International Preliminary Report on Patentability (Form PCT/IB/373) dated Feb. 6, 2018 of International Application No. PCT/JP2016/072417(counterpart of U.S. Appl. No. 15/749,250), with Form PCT/ISA/237. (22 pages).

International Preliminary Report on Patentability (Form PCT/IB/373) dated Feb. 27, 2018 of International Application No. PCT/JP2016/072452(counterpart of U.S. Appl. No. 15/754,406), with Form PCT/ISA/237. (8 pages).

Office Action dated Oct. 31, 2018, issued in Chinese application No. 201580071024.9, with English translation corresponds to U.S. Appl. No. 15/539,928. (11 pages).

Non-Final Office Action dated Jun. 18, 2018, issued in U.S. Appl. No. 15/539,926.

"What is Aerogel?" (Year:2008), https;//web.archive.org/web/20080621095754/http://www.aerogel.org/?p=3.

Extended European Search Report dated Jun. 14, 2018, issued in European Patent Application No. 15873333.7 (Corresponds to U.S. Appl. No. 15/539,927).

Markus Börner et al., "Cross-Linked Monolithic Xerogels Based on Silica Nanoparticles", Chemistry of Materials, 2013, pp. 3648-3653.

Baris R. Mutiu et al., Silicon alkoxide cross-linked silica nanoparticles gels for encapsulation of bacterial biocatalysts, Journal of Materials Chemistry A., 2013.

Extended European Search Report dated Jun. 27, 2018, issued in Application No. 15873330.3 (Corresponds to U.S. Appl. No. 15/539,926).

Non-Final Office Action dated Jul. 27, 2018, issued in U.S. Appl. No. 15/539,927.

Extended European Search Report dated Aug. 13, 2018, issued in Application No. 15873332.9 (Corresponds to U.S. Appl. No. 15/539,928).

Non-Final Office Action dated Aug. 5, 2020, issued in U.S. Appl. No. 15/749,250 (9 pages).

Office Action dated Jul. 31, 2020, issued in CN application No. 201580071036.1 (counterpart to U.S. Appl. No. 16/503,009), with English translation. (17 pages).

Office Action dated Aug. 5, 2020, issued in counterpart CN application No. 201580071018.3(counterpart to U.S. Appl. No. 15/539,946), with English translation. (18 pages).

Non-Final Office Action dated Sep. 16, 2020, issued in U.S. Appl. No. 15/539,928. (10 pages).

Office Action dated Sep. 29, 2020, issued in JP application No. 2016-149062 (counterpart to U.S. Appl. No. 15/754,406), with English translation. (8 pages).

Office Action dated Aug. 13, 2020, issued in counterpart TW application No. 105124139, with partial English translation. (17 pages).

Final Office Action dated Oct. 16, 2020, issued in U.S. Appl. No. 15/754,406. (11 pages).

Office Action dated Feb. 4, 2020, issued in TW application No. 105124140 (counterpart to U.S. Appl. No. 15/749,250), with partial English translation. (21 pages).

(56) References Cited

OTHER PUBLICATIONS

Office Action dated Feb. 4, 2020, issued in TW application No. 105125188 (counterpart to U.S. Appl. No. 15/754,406), with partial English translation. (12 pages).
Office Action dated Feb. 5, 2020, issued in counterpart TW application No. 105124139, with partial English translation. (15 pages).
Non-Final Office Action dated Mar. 18, 2020, issued in U.S. Appl. No. 15/754,406. (9 pages).
Office Action dated Mar. 16, 2020, issued in counterpart CN application No. 201680037679.9, with English translation. (13 pages).
Office Action dated Aug. 21, 2019, issued in TW application No. 104143837 (counterpart to U.S. Appl. No. 15/539,927), with partial English translation. (10 pages).
Office Action dated Nov. 6, 2019, issued in CN application No. 201580071018.3 (counterpart to U.S. Appl. No. 15/539,946), with English translation. (13 pages).
Office Action dated Nov. 6, 2019, issued in CN application No. 201580071036.1 (counterpart to U.S. Appl. No. 15/539,926), with English translation. (13 pages).
Extended (Supplementary) European Search Report dated Feb. 14, 2019, issued in EP application No. 16832969.6 (counterpart to U.S. Appl. No. 15/749,250)(6 pages).
Office Action dated Feb. 7, 2019, issued in EP application No. 15873333.7(counterpart to U.S. Appl. No. 15/539,927)(4 pages).
Extended (Supplementary) European Search Report dated Mar. 6, 2019, issued in counterpart EP application No. 16832970.4.(9 pages).
Requirement for Restriction Election dated Feb. 27, 2019, issued in U.S. Appl. No. 15/539,928 (7 pages).
Extended (Supplementary) European Search Report dated Mar. 7, 2019, issued in EP application No. 16839019.3 (counterpart to U.S. Appl. No. 15/754,406)(6 pages).
Notice of Allowance dated Mar. 28, 2019, issued in U.S. Appl. No. 15/539,927 (27 pages).
Horiba Scientific, "Particle Size Result Interpretation: Number vs. Volume Distributions", website entry: url: http://www.horiba.com/scientific/products/particle-characterization/education/general-information/data-interpretation/number-vs-volume-distributions/, cited in Notice of Allowance dated Mar. 28, 2019. (4 pages).
Requirement for Restriction Election dated Feb. 8, 2019, issued in U.S. Appl. No. 15/539,946 (5 pages).
Notice of Allowance dated Mar. 20, 2019, issued in U.S. Appl. No. 15/539,926 (28 pages).
Office Action dated May 31, 2019, issued in counterpart CN application No. 201680037679.9, with English translation. (10 pages).
Office Action dated Aug. 26, 2019, issued in EP application No. 15873333.7 (counterpart to U.S. Appl. No. 15/539,927). (3 pages).
Office Action dated Jul. 22, 2019, issued in TW application No. 104143840 (counterpart to U.S. Appl. No. 15/539,928), with English translation. (13 pages).
Office Action dated May 18, 2020, issued in CN application No. 201580071024.9 (counterpart to U.S. Appl. No. 16/503,009), with English translation. (27 pages).
Office Action dated Jun. 11, 2020, issued in CN application No. 201680043414.X (counterpart to U.S. Appl. No. 15/754,406), with English translation. (13 pages).
Notice of Allowance dated May 20, 2020, issued in U.S. Appl. No. 16/503,009. (47 pages).
Extended (Supplementary) European Search Report dated Sep. 24, 2018, issued in counterpart application No. 15873331.1. (9 pages).
Office Action dated Jan. 5, 2021, issued in JP Application No. 2019-198274, with English translation (10 pages) (counterpart to U.S. Appl. No. 16/503,009).
Final Office Action dated Oct. 27, 2020, issued in U.S. Appl. No. 15/539,946 (8 pages).
Office Action dated Nov. 2, 2020, issued in KR Application No. 10-2017-7035011, with English translation (15 pages) (counterpart to U.S. Appl. No. 15/749,250).
Extended Search Report dated Nov. 25, 2020, issued in EP Application No. 20189340.1 (6 pages) (counterpart to U.S. Appl. No. 15/749,250).
Office Action dated Nov. 19, 2020, issued in counterpart EP Application No. 16 832 970.4 (5 pages).
Office Action dated Nov. 24, 2020, issued in counterpart KR Application No. 10-2017-7035012, with English translation (12 pages).
Office Action dated Dec. 2, 2020, issued in KR Application No. 10-2017-7034375, with English translation (11 pages) (counterpart to U.S. Appl. No. 15/754,406).
Office Action dated Apr. 19, 2018, issued in U.S. Appl. No. 15/539,926. (10 pages).
Office Action dated Feb. 27, 2019, issued in CN application No. 201580071004.1 (counterpart to U.S. Appl. No. 15/539,927), with partial English translation. (12 pages).
Non-Final Office Action dated Jul. 10, 2019, issued in U.S. Appl. No. 15/539,928 (36 pages).
Office Action dated Jun. 28, 2019, issued in CN application No. 201580071024.9 (counterpart to U.S. Appl. No. 15/539,928), with partial machine translation. (12 pages).
Office Action dated Jul. 1, 2019, issued in CN application No. 201680043414.X (counterpart to U.S. Appl. No. 15/754,406), with partial machine translation. (15 pages).
Office Action dated Jun. 26, 2019, issued in TW application No. 104143838 (counterpart to U.S. Appl. No. 15/539,946), with partial English translation. (15 pages).
Office Action dated Aug. 6, 2019, issued in JP application No. 2019-133188 (counterpart to U.S. Appl. No. 15/539,946), with partial English translation. (7 pages).
Office Action dated Jul. 2, 2019, issued in TW application No. 104143841 (counterpart to U.S. Appl. No. 15/539,926), with partial English translation. (11 pages).
Search Report dated May 31, 2019, issued in counterpart CN application No. 2016800376799. (1 pages).
Office Action dated Jun. 11, 2019, issued in JP application No. 2015-176205 (counterpart to U.S. Appl. No. 15/539,946), with partial English translation. (5 pages).
Office Action dated Jun. 13, 2019, issued in JP application No. 2015-176204 (counterpart to U.S. Appl. No. 15/539,926), with partial English translation. (5 pages).
Non-Final Office Action dated Jan. 24, 2020, issued in U.S. Appl. No. 15/539,946. (63 pages).
Office Action dated Dec. 24, 2019, issued in JP application No. 2016-149062 (counterpart to U.S. Appl. No. 15/754,406), with English translation. (6 pages).
Office Action dated Jan. 7, 2020, issued in JP application No. 2016-149060 (counterpart to U.S. Appl. No. 15/749,250), with English translation. (12 pages).
Office Action dated Jan. 7, 2020, issued in counterpart JP application No. 2016-149061, with English translation. (12 pages).
Final Office Action dated Jan. 24, 2020, issued in U.S. Appl. No. 15/539,928. (8 pages).
Office Action dated Mar. 2, 2020, issued in EP application No. 1587333.7 (counterpart to U.S. Appl. No. 15/539,927). (4 pages).
Office Action dated Feb. 2, 2021, issued in CN Application No. 201580071024.9. with English translation (11 pages). (counterpart to U.S. Appl. No. 15/539,926).
Final Office Action dated Feb. 24, 2021, issued in U.S. Appl. No. 15/749,250 (25 pages).
Office Action dated Aug. 19, 2021, issued in CN Application No. 201580071024.9, with English Translation. (counterpart to U.S. Appl. No. 15/539,928)(17 pages).
Non-Final Action dated Sep. 9, 2021, issued in U.S. Appl. No. 15/749,250 (36 pages).
Office Action dated Jun. 30, 2021, issued in CN application No. 201680037716.6, with English Translation. (11 pages—counterpart to U.S. Appl. No. 15/749,250.
Non-Final Office Action dated May 13, 2021, issued in U.S. Appl. No. 15/754,406. (27 pages).
Non-Final Office Action dated May 27, 2021, issued in U.S. Appl. No. 15/539,928. (28 pages).

(56) References Cited

OTHER PUBLICATIONS

Office Action dated Jun. 3, 2021, issued in CN application No. 202010325596.8 (counterpart to U.S. Appl. No. 15/539,927), with English translation. (13 pages).
Non-Final Office Action dated Apr. 7, 2021, issued in U.S. Appl. No. 15/539,946 (16 pages).
Office Action dated Jan. 26, 2022, issued in KR application No. 10-2018-7008684 (counterpart to U.S. Appl. No. 15/758,073), with English translation. (15 pages).
Final Office Action dated Mar. 4, 2022, issued in U.S. Appl. No. 15/758,073. (112 pages).
Office Action dated Jan. 5, 2022, issued in JP application No. 2020-219354 (counterpart to U.S. Appl. No. 15/754,406), with English translation. (6 pages).
Final Office Action dated Feb. 2, 2022, issued in U.S. Appl. No. 15/539,928. (48 pages).
Final Office Action dated Jan. 24, 2022, issued in U.S. Appl. No. 15/754,406. (41 pages).
Final Office Action dated Jan. 21, 2022, issued in U.S. Appl. No. 15/539,946. (28 pages).
Office Action dated Jan. 28, 2022, issued in EP application No. 16839019.3 (counterpart to U.S. Appl. No. 15/754,406). (5 pages).
Office Action dated Feb. 8, 2022, issued in EP application No. 15873330.3 (counterpart to U.S. Appl. No. 15/539,926). (7 pages).
Office Action dated Sep. 6, 2021, issued in counterpart KR application No. 10-2017-7035012, with English translation. (3 pages).
Office Action dated Oct. 18, 2021, issued in KR application No. 10-2017-7034375 (counterpart to U.S. Appl. No. 15/754,406), with English translation. (11 pages).
Non-Final Office Action dated Sep. 3, 2021, issued in U.S. Appl. No. 15/758,073. (38 pages).
Office Action dated Mar. 17, 2022, issued in CN application No. 201680043414.X (counterpart to U.S. Appl. No. 15/754,406), with partial English translation. (18 pages).
Kunshi Zhang, "Submarine optoelectronic equipment technology", Harbin Engineering University Press, published on Dec. 31, 2012, p. 233, with partial English translation, cited in CN Office Action dated Mar. 17, 2022. (4 pages).
Zhixian Zhang, "Synthetic resin and plastic grade manual", Chemical Industry Press, published on Jan. 31, 2001, the second edition, vol. 2, p. 318, with partial English translation, cited in CN Office Action dated Mar. 17, 2022. (4 pages).
Office Action dated Apr. 6, 2022, issued in CN application No. 202010325596.8 (counterpart to U.S. Appl. No. 15/539,927), with English translation. (8 pages).
Office Action dated May 20, 2022, issued in KR application No. 10-2017-7018505 (counterpart to U.S. Appl. No. 15/539,946), with English translation. (13 pages).
Office Action dated May 30, 2022, issued in KR application No. 10-2017-7018502 (counterpart to U.S. Appl. No. 15/539,926), with English translation. (15 pages).
Office Action dated May 30, 2022, issued in KR application No. 10-2017-7018503 (counterpart to U.S. Appl. No. 15/539,946), with English translation. (17 pages).
Office Action dated Jun. 2, 2022, issued in KR application No. 10-2017-7018507 (counterpart to U.S. Appl. No. 15/539,927), with English translation. (13 pages).
Office Action dated Aug. 26, 2022, issued in KR application No. 10-2018-7008684 (counterpart to U.S. Appl. No. 15/758,073), with English translation. (17 pages).
Notice of Allowance dated Aug. 3, 2022, issued in U.S. Appl. No. 15/758,073. (27 pages).
International Search Report dated Dec. 13, 2016, issued in International Application No. PCT/JP2016/076217 (counterpart to U.S. Appl. No. 15/758,073). (1 page).
Office Action dated May 8, 2019, issued in CN Application No. 201680051845.0 (counterpart to U.S. Appl. No. 15/758,073), with partial English translation. (12 pages).
Office Action dated Nov. 12, 2019, issued in TW Application No. 105128742 (counterpart to U.S. Appl. No. 15/758,073), with English translation (16 pages).
Office Action dated Apr. 7, 2020, issued in JP application No. 2016-172343 (counterpart to U.S. Appl. No. 15/758,073), with English translation. (4 pages).
Office Action dated May 25, 2020, issued in KR Application No. 10-2018-7008684 (counterpart to U.S. Appl. No. 15/758,073), with Partial translation. (15 pages).
Office Action dated Oct. 20, 2020, issued in JP Application No. 2016-172343 (counterpart to U.S. Appl. No. 15/758,073), with English Translation. (5 pages).
Office Action dated Mar. 26, 2021, issued in KR Application No. 10-2018-7008684 (counterpart to U.S. Appl. No. 15/758,073), with partial English translation (16 pages).
Office Action dated Apr. 13, 2021, issued in JP Application No. 2016-172343 (counterpart to U.S. Appl. No. 15/758,073), with English Translation. (4 pages).
Non-Final Office Action dated Feb. 5, 2020, issued in U.S. Appl. No. 15/758,073. (15 pages).
Office Action dated Jul. 12, 2022, issued in JP application No. 2021-115086 (counterpart to U.S. Appl. No. 15/758,073), with English translation. (5 pages).
Non-Final Office Action dated Aug. 4, 2022, issued in U.S. Appl. No. 15/539,946. (5 pages).
Decision to Grant dated Oct. 25, 2022, issued in KR application No. 10-2017-7018502 (counterpart to U.S. Appl. No. 15/539,926), with partial English translation. (4 pages).
Decision to Grant dated Oct. 25, 2022, issued in KR application No. 10-2017-7018503 (counterpart to U.S. Appl. No. 15/539,946), with partial English translation. (4 pages).
Office Action dated Dec. 23, 2022, issued in KR application No. 10-2017-7018505 (counterpart to U.S. Appl. No. 15/539,928), with English translation. (15 pages).
Office Action dated Dec. 26, 2022, issued in KR application No. 10-2017-7018507 (counterpart to U.S. Appl. No. 15/539,927), with English translation. (6 pages).

\* cited by examiner

LAMINATED FILM, OPTICAL ELEMENT, AND IMAGE DISPLAY

TECHNICAL FIELD

The present invention relates to a laminated film, a method of producing a laminated film, an optical element, an image display, a method of producing an optical element, and a method of producing an image display.

BACKGROUND ART

Disposing two substrates at a regular spacing forms an air layer which is a void space between the substrates. The air layer formed between the substrates serves as a low refractive layer that reflects light entirely, for example. Thus, for example, in the case of an optical film, components such as a prism, a polarizing film, and a polarizing plate are disposed at regular spacings to provide air layers each of which serves as a low refractive index layer between the components. Forming air layers in such a manner, however, requires disposing the components at regular spacings, which prevents the components from being stacked sequentially and causes time and trouble in production. Combining optical elements through a spacer (frame) or the like for maintaining an air layer increases the thickness of the whole film, which goes against the need for a thin and lightweight film.

For solving such problems, there are attempts to develop a member such as a film having a low refractive index as a substitute for an air layer which is a void space between the components. For example, an organic-inorganic composite film obtained by adding a radically polymerizable monomer and a catalyst to a dispersion liquid of surface modification inorganic compound particles and curing the resultant by light irradiation has been proposed (Patent Document 1). Furthermore, for example, a method of improving the abrasion resistance by applying alkali treatment after formation of a silica aerogel film (a layer with void spaces (hereinafter, also referred to as a "void-provided layer")) has been also proposed (Patent Document 2).

CITATION LIST

Patent Document(s)

Patent Document 1: JP 2014-046518 A
Patent Document 2: JP 2009-258711 A

BRIEF SUMMARY OF THE INVENTION

Problem to be Solved by the Invention

There, however, is a problem that improving a film strength by a catalyst or the like simultaneously with forming a void-provided layer decreases the proportion of void space due to progression of catalysis. As described above, Patent Document 2 proposes improving the film strength by applying alkali treatment after formation of a void-provided layer. The alkali treatment can be, for example, a method of applying an alkaline solution to the void-provided layer or by bringing an ammonia gas into contact with the void-provided layer. The method of applying an alkaline solution to the void-provided layer, however, has a problem that the alkaline solution has little effect on inside the void-provided layer due to the low solvent resistance of the void-provided layer or the high water repellency because of the presence of void spaces. On the other hand, the method of bringing an ammonia gas into contact with the void-provided layer has a problem that the film strength improving treatment takes too much time, which results in a low manufacturing efficiency.

Hence, the present invention is intended to provide a laminated film including a void-provided layer that achieves both a high proportion of void space and a high film strength, a method of producing a laminated film, an optical element, an image display, a method of producing an optical element, and a method of producing an image display.

Means for Solving Problem

In order to achieve the above object, the present invention provides a laminated film including: a void-provided layer; and a resin film, the void-provided layer being stacked on the resin film. The laminated film is produced by a method including steps of: forming a void-provided structure, which is a precursor of the void-provided layer, on the resin film; and causing a crosslinking reaction in the precursor after the precursor forming step, wherein the precursor contains a substance that generates a crosslinking reaction accelerator for accelerating the crosslinking reaction, the substance is a substance that generates the crosslinking reaction accelerator by light irradiation or heating, the crosslinking reaction accelerator is not generated in the precursor forming step, and the crosslinking reaction accelerator is generated by light irradiation or heating in the crosslinking reaction step having multiple stages.

The present invention also provides a method of producing a laminated film in which a void-provided layer is stacked on a resin film, including steps of forming a void-provided structure, which is a precursor of the void-provided layer, on the resin film; and causing a crosslinking reaction in the precursor after the precursor forming step, wherein the precursor contains a substance that generates a crosslinking reaction accelerator for accelerating the crosslinking reaction, the substance is a substance that generates the crosslinking reaction accelerator by light irradiation or heating, the crosslinking reaction accelerator is not generated in the precursor forming step, and the crosslinking reaction accelerator is generated by light irradiation or heating in the crosslinking reaction step having multiple stages.

The present invention also provides an optical element including the laminated film according to the present invention.

The present invention also provides an image display including the optical element according to the present invention.

The present invention also provides a method of producing an optical element including a laminated film, including a step of producing the laminated film by the method of producing a laminated film according to the present invention.

The present invention also provides a method of producing an image display including an optical element, including a step of producing the optical element by the method of producing an optical element according to the present invention.

Effects of the Invention

According to the present invention, a laminated film that achieves both a high proportion of void space and a high film strength, a method of producing a laminated film, an optical element, an image display, a method of producing an optical element, and a method of producing an image display can be provided. The laminated film of the present invention may be used for an optical element and an image display of the present invention, for example. The present invention, however, is not limited thereto and can be used for any purpose.

DETAILED DESCRIPTION OF THE INVENTION

Figure 1:
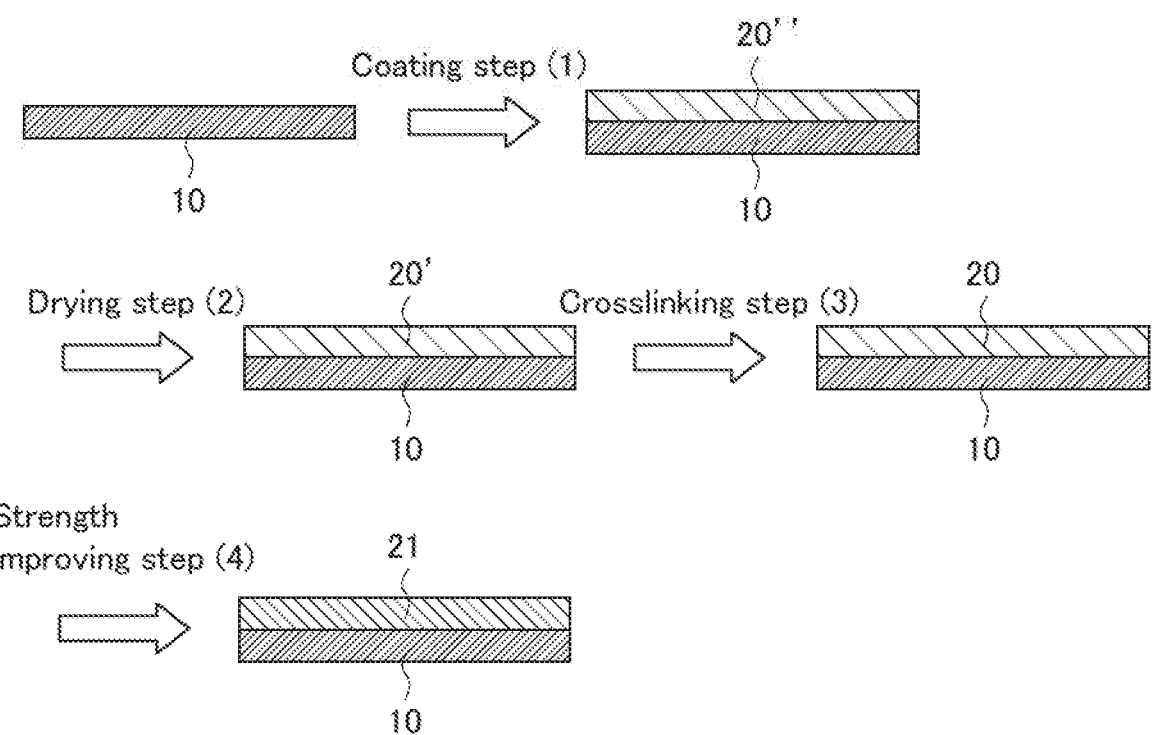
FIG. 1 is a process cross sectional view schematically showing an example of the method of forming a void-provided layer 21 on a resin film 10 in the present invention.

The present invention is described below in more detail with reference to illustrative examples. The present invention, however, is not limited or restricted by the following description. The laminated film of the present invention may be, as described above, a laminated film in the form of a roll (the laminated film roll of the present invention). A part of the laminated film roll of the present invention may be cut to be used as the laminated film of the present invention, for example. Hereinafter, the "laminated film of the present invention" shall include the laminated film roll of the present invention, unless otherwise stated. Moreover, hereinafter the "production method of a laminated film of the present invention" shall include the production method of a laminated film roll of the present invention, unless otherwise stated.

In the production method of a laminated film of the present invention, the crosslinking accelerator may contain an acidic substance or a basic substance, for example. In this case, for example, the acidic substance or the basic substance is not generated in the precursor forming step, and the acidic substance or the basic substance is generated by light irradiation or heating in the crosslinking reaction step.

In the production method of a laminated film of the present invention, for example, the crosslinking reaction is caused in the precursor by heating the precursor at at least one stage of stages from the second stage of the crosslinking reaction step. Note that, in the present invention, the crosslinking reaction step has multiple stages as described above. Specifically, the crosslinking reaction step may have two stages or three or more stages.

The strength of the precursor may be further improved at at least one stage of stages from the second stage of the crosslinking reaction step, for example. Furthermore, the peel strength of the precursor to the resin film may be further improved at at least one stage of stages from the second stage of the crosslinking reaction step, for example.

In the production method of a laminated film of the present invention, as described above, the precursor contains a substance that generates a basic substance by light irradiation or heating, and the basic substance is generated by light irradiation or heating in the precursor forming step.

In the production method of a laminated film of the present invention, the void-provided layer may include a part where one kind or two or more kinds of structural units that form a structure with minute void spaces are chemically bonded directly or indirectly, for example. For example, in the void-provided layer, there may be a part where the structural units are in contact with each other but not chemically bonded, for example. Note that, in the present invention, "the structural units are "indirectly bonded"" means that the structural units are bonded through binder components each of which is smaller in amount than the structural unit. On the other hand, "the structural units are "directly bonded"" means that the structural units are bonded to one another directly without involving binder components and the like. The bond among the structural units may be a bond through catalysis, for example. The bond among the structural units may include a hydrogen bond or a covalent bond, for example. The structural units may be in the shape of at least one of a particle, fiber, and a plate, for example. Each of the structural unit in the shape of a particle and the structural unit in the shape of a plate may be made of an inorganic matter, for example. The configuration element of the structural unit in the shape of a particle may include at least one element selected from the group consisting of Si, Mg, Al, Ti, Zn, and Zr, for example. The structure (structural unit) in the shape of a particle may be a solid particle or a hollow particle, and specific examples thereof include silicon particles, silicon particles with micropores, silica hollow nanoparticles, and silica hollow nanoballoons. The structural unit in the shape of fiber can be, for example, nanofiber having a nano-sized diameter, and specific examples thereof include cellulose nanofiber and alumina nanofiber. The structural unit in the shape of a plate can be, for example, nanoclay. Specifically, the structural unit in the shape of a plate can be, for example, nano-sized bentonite (for example, Kunipia F [product name]). The structural unit in the shape of fiber may be at least one selected from the group consisting of carbon nanofiber, cellulose nanofiber, alumina nanofiber, chitin nanofiber, chitosan nanofiber, polymer nanofiber, glass nanofiber, and silica nanofiber, for example, although it is not particularly limited. The structural unit may be, for example, a microporous particle. For example, the void-provided layer may be a porous body in which microporous particles are chemically bonded, and the microporous particles may be chemically bonded in the void-provided layer forming step, for example. In the present invention, the shape of the "particle" (for example, the microporous particle) is not limited to particular shapes, and can be, for example, a spherical shape or any other shape. Furthermore, in the present invention, the microporous particle may be, for example, a sol-gel beaded particle, a nanoparticle (hollow nanosilica/nanoballoon particle), nanofiber, and the like as described above. In the production method of a laminated film of the present invention, the microporous particle is, for example, a silicon compound microporous particle and the porous body is a silicone porous body. The silicon compound microporous particle includes, for example, a pulverized product of a gelled silica compound. Another embodiment of the void-provided layer includes a void-provided layer including fibrous substances such as nanofiber, wherein the fibrous substances are entangled to form a layer with void spaces. The production method of such a void-provided layer is not particularly limited, and is the same as that of the void-provided layer of the porous body in which the microporous particles are chemically bonded. Besides the aforementioned embodiment, as described above, the void-provided layer may be a void-provided layer formed by using hollow nanoparticles and nanoclay or a void-provided layer formed by using hollow nanoballoons and magnesium fluoride.

These void-provided layers may be void-provided layers made of a single configuration substance or of multiple configuration substances. The void-provided layer may be the layer adopting one of the aforementioned embodiments or the layer adopting more than one of the aforementioned embodiments. The present invention is described below mainly with reference to the void-provided layer of a porous body in which the microporous particles are chemically bonded.

In the production method of a laminated film of the present invention, for example, the microporous particle is a silicon compound microporous particle and the porous body is a silicone porous body.

In the production method of a laminated film of the present invention, for example, the silicon compound microporous particle includes a pulverized product of a gelled silica compound, for example.

In the production method of a laminated film of the present invention, for example, the porous structure of the porous body has an open-cell structure in which the pore structures are interconnected.

The production method of a laminated film of the present invention, for example, further includes steps of: preparing a liquid containing the microporous particles (hereinafter, also referred to as a "microporous particle-containing liquid"); coating the resin film with the liquid; and drying the liquid applied on the resin film, wherein the microporous particles are chemically bonded in the crosslinking reaction step.

In the crosslinking reaction step of the production method of a laminated film of the present invention, for example, the microporous particles are chemically bonded by the catalysis of the catalyst. For example, in the crosslinking reaction step, the crosslinking reaction accelerator generated by light irradiation or heating may be the catalyst, and the microporous particles may be chemically bonded by the crosslinking reaction accelerator.

In the crosslinking reaction step of the production method of a laminated film of the present invention, for example, the microporous particles are chemically bonded by light irradiation.

In the crosslinking reaction step of the production method of a laminated film of the present invention, for example, the microporous particles are chemically bonded by heating.

In the production method of a laminated film of the present invention, for example, the refractive index of the void-provided layer is 0.1 more than the refractive index of the precursor.

In the production method of a laminated film of the present invention, for example, the void-provided layer is formed so as to have a refractive index of 1.25 or less.

In the production method of a laminated film of the present invention, for example, the void-provided layer is formed so as to have a proportion of void space of 40 vol % or more.

In the production method of a laminated film of the present invention, for example, the void-provided layer is formed so as to have a thickness in the range from 0.01 μm to 100 μm.

In the production method of a laminated film of the present invention, for example, the void-provided layer is formed so as to have a haze value of less than 5%.

In the production method of a laminated film of the present invention, for example, the void-provided layer is formed so as to have a peel strength to the resin film of 1N/25 mm or more.

In the production method of a laminated film of the present invention, for example, the resin film is a long resin film, and the precursor and the void-provided layer are continuously formed on the resin film. Furthermore, in the production method of a laminated film of the present invention, for example, a part of the laminated film roll (laminated film roll of the present invention) may be cut to be used as the laminated film of the present invention.

As to the laminated film roll of the present invention, the production method thereof is not particularly limited. For example, the laminated film roll of the present invention is a laminated film roll produced by the production method of a laminated film roll of the present invention. As to the laminated film of the present invention, the production method thereof is not particularly limited. For example, the laminated film of the present invention is a laminated film produced by the production method of a laminated film of the present invention.

The present invention is described below in more detail.

[1. Laminated Film and Production Method of the Laminated Film]

As described above, the production method of a laminated film of the present invention includes steps of forming a void-provided structure, which is a precursor of the void-provided layer, on a resin film; and causing a crosslinking reaction in the precursor after the precursor forming step. Furthermore, as described above, the laminated film of the present invention is a laminated film produced by the production method of a laminated film of the present invention. The laminated film of the present invention may be, for example, a long laminated film roll (the laminated film of the present invention roll).

[1-1. Laminated Film]

In the laminated film of the present invention, the resin film is not limited to particular resin films, and examples of the resin include thermoplastic resins with superior transparency such as polyethylene terephthalate (PET), acryl, cellulose acetate propionate (CAP), cycloolefin polymer (COP), triacetate (TAC), polyethylene naphthalate (PEN), polyethylene (PE), and polypropylene (PP).

The void-provided layer of the laminated film roll or the laminated film of the present invention (hereinafter, also referred to as a "void-provided layer of the present invention") may be directly stacked on the resin film or indirectly stacked on the resin film through another layer, for example.

The laminated film of the present invention can be said as, for example, a low refractive material having the above-described properties, including the void-provided layer and the resin film, wherein the void-provided layer is stacked on the resin film.

In the void-provided layer of the present invention, the residual ratio of an abrasion resistance showing a film strength, measured with BEMCOT®, is in the range from 60% to 100%, for example. The void-provided layer of the present invention having such film strength is resistant to a physical impact in winding during production and in use, for example. The lower limit of the abrasion resistance is, for example, 60% or more, 80% or more, or 90% or more, the upper limit thereof is, for example, 100% or less, 99% or less, or 98% or less, and the abrasion resistance is, for example, in the range from 60% to 100%, 80% to 99%, or 90% to 98%.

The abrasion resistance can be measured by the following method, for example.

(Evaluation of Abrasion Resistance)

(1) The laminated film of the present invention is cut into a circle having a diameter of 15 mm as a sample, and the sliding test (abrasion resistance test) to the void-provided layer is performed using BEMCOT®. The sliding condition is as follows: weight: 100 g, reciprocation: 10 times.

(2) The abrasion resistance of the void-provided layer after completion of the abrasion resistance test described in the item (1) is visually evaluated. The evaluation criteria are as follows:

0 to 9 scratches; good
10 to 29 scratches; fair, and
30 or more scratches; not good.

The film density of the void-provided layer of the present invention is not particularly limited, and the lower limit thereof is, for example, 1 g/cm³ or more, 10 g/cm³ or more, 15 g/cm³ or more, the upper limit thereof is, for example, 50 g/cm³ or less, 40 g/cm³ or less, or 30 g/cm³ or less, or 2.1 g/cm³ or less, and the film density is, for example, in the range from 5 to 50 g/cm³, 10 to 40 g/cm³, 15 to 30 g/cm³, or 1 to 2.1 g/cm³. In the void-provided layer of the present invention, the lower limit of the porosity based on the film density is, for example, 50% or more, 70% or more, or 85% or more, the upper limit thereof is, for example, 98% or less or 95% or less, and the porosity is, for example, in the range from 50% to 98%, 70% to 95%, or 85% to 95%.

The film density can be measured, for example, by the method described below, and the porosity can be calculated, for example, as described below based on the film density.

(Evaluation of Film Density and Porosity)

After forming a void-provided layer (the void-provided layer of the present invention) on a base (acrylic film), the X-ray reflectivity in a total reflection region of the void-provided layer of this laminate is measured using an X-ray diffractometer (product of RIGAKU, product name: RINT-2000). Then, after fitting with Intensity at 2θ, the film density (g/cm³) is calculated from the total reflection angle of the laminate (void-provided layer and base), and the porosity (P %) is calculated according to the following formula.

porosity ($P$ %)=45.48×film density($g/cm^3$)+100 (%)

The void-provided layer of the present invention has, for example, a pore structure. The size of a void space (pore) in the present invention indicates not the diameter of the short axis but the diameter of the long axis of the void space. The size of a void space (pore) is not particularly limited, and is, for example, in the range from 2 nm to 500 nm. The lower limit of the size of a void space is, for example, 2 nm or more, 5 nm or more, 10 nm or more, or 20 nm or more, the upper limit of the size of a void space is, for example, 500 nm or less, 200 nm or less, or 100 nm or less, and the size of a void space is, for example, in the range from 2 nm to 500 nm, 5 nm to 500 nm, 10 nm to 200 nm, or 20 nm to 100 nm. A preferable size of a void space changes depending on applications of the void-provided structure. Thus, the size of a void space should be adjusted to a desired size according to purposes, for example. The size of a void space can be evaluated by the method described below.

(Evaluation of Size of Void Space)

In the present invention, the size of a void space can be quantified according to the BET test. Specifically, 0.1 g of a sample (the void-provided layer of the present invention) is set in the capillary of a surface area measurement apparatus (product of Micromeritics, product name: ASAP 2020), and dried under a reduced pressure at room temperature for 24 hours to remove gas in the void-provided structure. Then, an adsorption isotherm is created by adsorbing a nitrogen gas to the sample, thereby obtaining a pore distribution. The size of a void space can thereby be evaluated.

It is only required that the void-provided layer of the present invention has a pore structure (porous structure) as described above, for example, and the void-provided layer may have an open-cell structure in which the pore structures are interconnected, for example. The open-cell structure means, for example, that the pore structures are three-dimensionally interconnected in the silicon porous body, i.e., void spaces in the pore structures are interconnected. When a porous body has an open-cell structure, the porosity of the bulk body can be increased. However, an open-cell structure cannot be formed with closed-cell particles such as hollow silica. In this regard, for example, when the silica sol particle (pulverized product of a gelled silicon compound which forms sol) is used, since the particles have a three-dimensional dendritic structure, the void-provided layer of the present invention can form an open-cell structure easily by settlement and deposition of the dendritic particles in a coating film (sol coating film containing the pulverized products of a gelled silicon compound). The void-provided layer of the present invention preferably forms a monolith structure in which the open-cell structure has multiple pore distributions. The monolith structure denotes a hierarchical structure including a structure in which nano-sized void spaces are present and an open-cell structure in which the nano-sized spaces are aggregated, for example. The monolith structure can impart a film strength with minute void spaces while imparting a high porosity with coarse open-cell structure, which achieve both a film strength and a high porosity, for example. For forming such a monolith structure, for example, it is preferable to control the pore distribution of a void-provided structure to be created in a gel (gelled silicon compound) before pulverizing into the silica sol particles. For example, by controlling the particle size distribution of silica sol particles after pulverization to a desired size in pulverization of the gelled silicon compound, the monolith structure can be formed.

In the void-provided layer of the present invention, the haze showing transparency is not particularly limited, and the upper limit thereof is, for example, less than 5% or less than 3%, the lower limit thereof is, for example, 0.1% or more or 0.2% or more, and the haze is, for example, 0.1% or more and less than 5% or 0.2% or more and less than 3%.

The haze can be measured, for example, by the method described below.

(Evaluation of Haze)

A void-provided layer (the void-provided layer of the present invention) is cut into a piece having a size of 50 mm×50 mm, and the obtained piece is set to a hazemeter (product of Murakami Color Research Laboratory, product name: HM-150) to measure a haze. The haze value is calculated according to the following formula.

haze(%)=[diffuse transmittance(%)/total light transmittance(%)]×100 (%)

Commonly, a ratio between the transmission speed of the wavefront of light in vacuum and the phase velocity of light in a medium is called a refractive index of the medium. The upper limit of the refractive index of the void-provided layer of the present invention is, for example, 1.25 or less, 1.20 or less or 1.15 or less, the lower limit thereof is, for example, 1.05 or more, 1.06 or more, or 1.07 or more, and the refractive index is, for example, in the range from 1.05 to 1.20, 1.06 to 1.20, or 1.07 to 1.15.

In the present invention, the refractive index is a refractive index measured at the wavelength of 550 nm unless otherwise stated. The method of measuring a refractive index is not limited to particular methods, and the refractive index can be measured, for example, by the method described below.

(Evaluation of Refractive Index)

After forming a void-provided layer (the void-provided layer of the present invention) on an acrylic film, the obtained laminate is cut into a piece having a size of 50 mm×50 mm, and the obtained piece is adhered on the front surface of a glass plate (thickness: 3 mm) through a pressure-sensitive adhesive layer. The center of the back surface of the glass plate (diameter: about 20 mm) is solidly painted with a black magic marker, thereby preparing a sample which allows no reflection at the back surface of the glass plate. The sample is set to an ellipsometer (product of J. A. Woollam Japan, product name: VASE), the refractive index is measured at the wavelength of 500 nm and at the incidence angle of 50° to 80°, and the average value is assumed as a refractive index.

When the void-provided layer of the present invention is formed on the resin film, the peel strength showing adhesion between the void-provided layer and the resin film is not particularly limited, and the lower limit thereof is, for example, 1 N/25 mm or more, 2 N/25 mm or more, or 3 N/25 mm or more, the upper limit thereof is, for example, 30 N/25 mm or less, 20 N/25 mm or less, or 10 N/25 mm or less, and the peel strength is, for example, in the range from 1 to 30 N/25 mm, 2 to 20 N/25 mm, or 3 to 10 N/25 mm.

The method of measuring the peel strength is not limited to particular methods, and the peel strength can be measured by the method described below, for example.

(Evaluation of Peel Strength)

From the laminated film of the present invention, a piece having a size of 50 mm×140 mm is obtained as a sample and the sample is fixed to a stainless plate with a double-sided tape. An acrylic pressure-sensitive adhesive layer (thickness: 20 µm) is adhered to a PET film (product of Mitsubishi Plastics, Inc., product name: T100), the thus obtained adhesive tape is cut into a piece having a size of 25 mm×100 mm, and the obtained piece is adhered to the void-provided layer of the laminated film of the present invention to form a laminate of the PET film and the void-provided layer. Then, the sample is chucked in an autograph tensile testing machine (product of Shimadzu Corporation, product name: AG-Xplus) with a chuck space of 100 mm, and the tensile test is performed at the tensile speed of 0.3 m/min. The average of 50 mm peel test is assumed as the peel strength.

The thickness of the void-provided layer of the present invention is not limited to particular, and the lower limit thereof is, for example, 0.01 µm or more, 0.05 µm or more, 0.1 µm or more, or 0.3 µm or more, the upper limit thereof is, for example, 1000 µm or less, 100 µm or less, 80 µm or less, 50 µm or less, or 10 µm or less, and the thickness is, for example, in the range from 0.01 µm to 100 µm.

As described above, the void-provided layer of the present invention includes pulverized products of a gelled compound, wherein the pulverized products are chemically bonded, for example. In the void-provided layer of the present invention, the pattern of the chemical bond among the pulverized products is not limited to particular patterns. Specifically, the chemical bond can be, for example, a crosslinking bond. The method of chemically bonding the pulverized products is described in detail in the description as to the production method of the present invention.

The gel form of the gelled compound is not limited to particular forms. The "gel" commonly denotes a solidified state of solutes aggregated as they lost independent motility due to interaction. Commonly, a wet gel is a gel containing a dispersion medium in which solutes build a uniform structure, and a xerogel is a gel from which a solvent is removed and in which solutes form a network structure with void spaces. In the present invention, the gelled compound can be a wet gel or a xerogel, for example.

The gelled compound can be, for example, a gelled product obtained by gelating monomer compounds. Specifically, the gelled silicon compound can be, for example, a gelled product in which the monomer silicon compounds are bonded. As a specific example, the gelled silicon compound can be a gelled product in which the monomer silicon compounds are bonded by a hydrogen bond or an intermolecular bond. The bond can be, for example, a bond by dehydration condensation. The method of gelation is described below in the description as to the production method of the present invention.

In the void-provided layer of the present invention, the volume average particle size showing particle size variations of the pulverized product is not particularly limited, and the lower limit thereof is, for example, 0.10 µm or more, 0.20 µm or more, or 0.40 µm or more, the upper limit thereof is, for example, 2.00 µm or less, 1.50 µm or less, or 1.00 µm or less, and the volume average particle size is, for example, in the range from 0.10 µm to 2.00 µm, 0.20 µm to 1.50 µm, or 0.40 µm to 1.00 µm. The particle size distribution can be measured, for example, using a particle size distribution analyzer based on dynamic light scattering, laser diffraction, or the like or using an electron microscope such as a scanning electron microscope (SEM) or a transmission electron microscope (TEM).

The particle size distribution showing particle size variations of the pulverized product is not particularly limited. The distribution of the particle having a particle size of 0.4 µm to 1 µm is in the range from 50 wt % to 99.9 wt %, 80 wt % to 99.8 wt %, or 90 wt % to 99.7 wt % or the distribution of the particle having a particle size of 1 µm to 2 µm is in the range from 0.1 wt % to 50 wt %, 0.2 wt % to 20 wt %, or 0.3 wt % to 10 wt %, for example. The particle size distribution can be measured, for example, using a particle size distribution analyzer or an electron microscope.

In the void-provided layer of the present invention, the type of the gelled compound is not limited to particular types. The gelled compound can be, for example, a gelled silicon compound. The present invention is described below with reference to an example in which the gelled compound is a gelled silicon compound. The present invention, however, is not limited thereto.

The crosslinking bond is, for example, a siloxane bond. Examples of the siloxane bond include T2 bond, T3 bond, and T4 bond shown below. In the case where the void-provided layer of the present invention has the siloxane bond, the void-provided layer of the present invention may have one of, two of, or all of the above-mentioned three bond patterns, for example. The void-provided layer having higher proportions of T2 and T3 is superior in flexibility and can be expected to have an original property of a gel but is inferior in film strength. On the other hand, the void-provided layer having a higher proportion of T4 is superior in film strength but has small sized void spaces and is inferior in flexibility. Thus, it is preferable to change the proportions of T2, T3, and T4 depending on applications, for example.

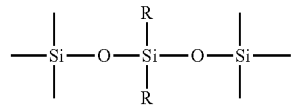

T2

-continued

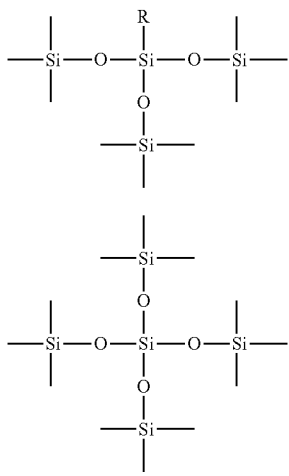

T3

T4

In the case where the void-provided layer of the present invention has the siloxane bond, the relative ratio among T2, T3, and T4 with T2 being considered as "1" is, for example, as follows:

$T2:T3:T4=1:[1$ to $100]:[0$ to $50]$, $1:[1$ to $80]:[1$ to $40]$, or $1:[5$ to $60]:[1$ to $30]$.

The silicon atoms contained in the void-provided layer of the present invention are preferably bonded by a siloxane bond, for example. As a specific example, the proportion of the unbonded silicon atoms (i.e., residual silanol) among all the silicon atoms contained in the void-provided layer is, for example, less than 50%, 30% or less, or 15% or less.

When the gelled compound is the gelled silicon compound, the monomer silicon compound is not limited to particular compounds. The monomer silicon compound can be, for example, a compound represented by the following chemical formula (1). When the gelled silicon compound is a gelled product in which monomer silicon compounds are bonded by a hydrogen bond or an intermolecular bond as described above, monomers in the chemical formula (1) can be bonded by a hydrogen bond through their hydroxyl groups, for example.

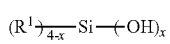
(1)

In the chemical formula (1), for example, X is 2, 3, or 4, and $R^1$ represents a linear or a branched alkyl group. The carbon number of $R^1$ is, for example, 1 to 6, 1 to 4, or 1 to 2. Examples of the linear alkyl group include a methyl group, an ethyl group, a propyl group, a butyl group, a pentyl group, and a hexyl group, and examples of the branched alkyl group include an isopropyl group and an isobutyl group. The X is, for example, 3 or 4.

A specific example of the silicon compound represented by the chemical formula (1) can be a compound represented by the chemical formula (1'), wherein X is 3. In the chemical formula (1'), $R^1$ is the same as that in the chemical formula (1), and is, for example, a methyl group. When $R^1$ represents a methyl group, the silicon compound is tris(hydroxy) methylsilane. When X is 3, the silicon compound is, for example, trifunctional silane having three functional groups.

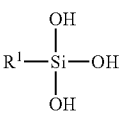
(1')

A specific example of the silicon compound represented by the chemical formula (1) can be a compound represented by the chemical formula (1') wherein X is 4. In this case, the silicon compound is, for example, tetrafunctional silane having four functional groups.

The monomer silicon compound may be, for example, a hydrolysate of a silicon compound precursor. The silicon compound precursor is not limited as long as it can generate the silicon compound by hydrolysis, for example. A specific example of the silicon compound precursor can be a compound represented by the following chemical formula (2).

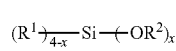
(2)

In the chemical formula (2), for example, X is 2, 3, or 4, $R^1$ and $R^2$ each represent a linear or branched alkyl group, $R^1$ and $R^2$ may be the same or different, $R^1$ may be the same or different in the case where X is 2, and $R^2$ may be the same or different.

X and $R^1$ are the same as those in the chemical formula (1), for example. Regarding $R^2$, for example, reference can be made to the examples of $R^1$ in the chemical formula (1).

A specific example of the silicon compound precursor represented by the chemical formula (2) can be a compound represented by the chemical formula (2') wherein X is 3. In the chemical formula (2'), $R^1$ and $R^2$ are the same as those in the chemical formula (2). When $R^1$ and $R^2$ both represent methyl groups, the silicon compound precursor is trimethoxy(methyl)silane (hereinafter, also referred to as "MTMS").

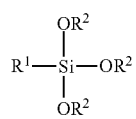
(2')

The monomer silicon compound is preferably the trifunctional silane because it is superior in the lowness of refractive index. Also, the monomer silicon compound is preferably the tetrafunctional silane because it is superior in strength (for example, abrasion resistance). Regarding the monomer silicon compounds which are raw materials of the gelled silicon compound, one of the compounds may be used alone or two or more of them may be used in combination, for example. As a specific example, the monomer silicon compound may include only the trifunctional silane, only the tetrafunctional silane, or both of the trifunctional silane and the tetrafunctional silane, and may further include other silicon compounds, for example. When two or more kinds of silicon compounds are used as the monomer silicon compound, the ratio between the compounds is not particularly limited and can be determined appropriately.

In the laminated film of the present invention, the void-provided layer may contain a catalyst for chemically bonding one kind or two or more kinds of structural units that form a structure with minute void spaces, for example. The content of the catalyst is not particularly limited, and the content of the catalyst relative to the weight of the structural unit is, for example, 0.01 wt % to 20 wt %, 0.05 wt % to 10 wt %, or 0.1 wt % to 5 wt %.

In the laminated film of the present invention, the void-provided layer may further contain a crosslinking assisting agent for indirectly bonding one kind or two or more kinds of structural units that form a structure with minute void spaces, for example. The content of the crosslinking assisting agent is not particularly limited, and the content of the crosslinking assisting agent relative to the weight of the structural unit is, for example, 0.01 wt % to 20 wt %, 0.05 wt % to 15 wt %, or 0.1 wt % to 10 wt %.

The form of the void-provided layer of the present invention is not limited to particular forms, and is normally in the form of a film.

The void-provided layer of the present invention is, for example, a roll. For example, the present invention may further include a resin film, and the void-provided layer may be formed on the long resin film as described above. In this case, another long film may be stacked on the laminated film of the present invention. Specifically, another long resin film (for example, interleaving paper, release film, surface protection film, or the like) may be stacked on the laminated film of the present invention including the resin film and the void-provided layer, and then the obtained laminate may be wound in the form of a roll.

The method of producing a laminated film of the present invention is not limited to particular methods, and the laminated film of the present invention can be produced, for example, by the production method of the present invention described below.

[1-2. Production Method of Laminated Film]

As described above, the production method of a laminated film of the present invention includes steps of forming a void-provided structure, which is a precursor of the void-provided layer, on a resin film; and causing a crosslinking reaction in the precursor after the precursor forming step.

In the production method of a laminated film of the present invention, as described above, the void-provided layer is a porous body in which microporous particles are chemically bonded, and the microporous particles are chemically bonded in the precursor forming step, for example. The production method of a laminated film of the present invention, as described above, further includes steps of preparing a liquid containing the microporous particles; and drying the liquid, wherein the precursor of the porous body is formed by chemically bonding the microporous particles in the dried body in the precursor forming step, for example. The liquid containing the microporous particles (also referred to as the "microporous particle-containing liquid" or the "liquid") is not limited to particular liquids, and can be, for example, a suspension containing the microporous particles. The present invention is described below mainly with reference to an example in which the microporous particle is a pulverized product of a gelled compound and the void-provided layer is a porous body (preferably, silicone porous body) including pulverized products of a gelled compound. The present invention, however, can be performed in the same manner also in the case where the microporous particle is something other than the pulverized product of a gelled compound.

The production method of the present invention forms a void-provided layer which is superior in the lowness of refractive index, for example. The following theory about the reason for this can be formed. The present invention, however, is not limited thereto.

Since the pulverized product used in the production method of the present invention is obtained by pulverizing the gelled silicon compound, the three-dimensional structure of the gelled silicon compound before pulverization is dispersed into three-dimensional basic structures. In the production method of the present invention, the precursor having a porous structure based on the three-dimensional basic structures is formed by coating the base with the pulverized products of a gelled silicon compound. That is, according to the production method of the present invention, a new porous structure is formed of the pulverized products each having the three-dimensional basic structure, which is different from the three-dimensional structure of the gelled silicon compound. Thus, the finally obtained void-provided layer brings about an effect of a low refractive index equivalent to an air layer, for example. Moreover, in the production method of the present invention, since the pulverized products are chemically bonded, the new three-dimensional structure is immobilized. Thus, the finally obtained void-provided layer, despite its structure with void spaces, can maintain a sufficient strength and sufficient flexibility. The void-provided layer obtained by the production method of the present invention is useful as a substitute for the air layer, in an aspect of low refractive index as well as in strength and flexibility, for example. In the case of an air layer, the air layer is formed between the components by stacking components with a space by providing a spacer or the like therebetween. The void-provided layer obtained by the production method of the present invention can achieve a low refractive index equivalent to the air layer simply by disposing it at a desired site, for example. Thus, as described above, the present invention can impart a low refractive index equivalent to the air layer to an optical element easier and simpler than forming the air layer.

In the present invention, the precursor forming step of forming a void-provided structure which is a precursor of the void-provided layer and the crosslinking reaction step of causing a crosslinking reaction in the precursor after the precursor forming step are performed as separate steps. The crosslinking reaction step has multiple stages. Since the crosslinking reaction step has multiple stages, for example, the strength of the precursor is further improved as compared to the crosslinking reaction step having one stage. Thus, the void-provided layer of the present invention achieving both a high proportion of void space and a high film strength can be obtained. While the mechanism for this is unknown, for example, it is presumed as follows. That is, as described above, there is a problem that improving a film strength by a catalyst or the like simultaneously with forming a void-provided layer decreases the proportion of void space due to progression of catalysis. It is considered, for example, that the increase in the number of cross-linkages (chemical bonds) of microporous particles due to the progression of crosslinking reaction of microporous particles by a catalyst strengthens the bond but causes aggregation of the entire void-provided layer, which decreases the proportion of void space. On the other hand, it is considered that since the precursor forming step and the crosslinking reaction step are performed as separate steps and the crosslinking reaction step has multiple stages, for example, the number of cross-linkages (chemical bonds) can be increased without changing the form of the entire precursor (for example, without causing much aggregation of the entire precursor). This mechanism, however, is an example of presumable mechanisms, and does not limit the present invention.

In the precursor forming step, for example, particles having a particular shape are stacked to form the precursor of the void-provided layer, and the strength of the precursor at that moment is very low. Thereafter, for example, by the reaction of a photoactive catalyst or a thermoactive catalyst, a crosslinking reaction accelerator (for example, a strong base catalyst or the like generated from a photobase generator) that can chemically bond the microporous particles is generated (the first stage of the crosslinking reaction step). It is considered that, by further performing thermal aging (the second stage of the crosslinking reaction step) for efficiently progressing the reaction in a short time, the chemical bond (crosslinking reaction) of the microporous particles further progresses, thereby improving the strength. As a specific example, when the microporous particle is a silicon compound microporous particle (for example, pulverized products of a gelled silica compound) and residual silanol groups (OH groups) are present in the precursor, the residual silanol groups are chemically bonded by the crosslinking reaction. The description, however, is an illustrative example and does not limit the present invention.

Regarding the production method of a laminated film of the present invention, reference can be made to the description as to the void-provided layer and the laminated film of the present invention unless otherwise stated.

Regarding the gelled compound, the pulverized product thereof, the monomer compound, and the precursor of the monomer compound in the production method of a laminated film of the present invention, reference can be made to the description as to the void-provided layer and of the laminated film of the present invention.

The production method of the laminated film of the present invention can be performed as described below, for example. The present invention, however, is not limited thereto.

The production method of the laminated film of the present invention, for example, includes a step of preparing the microporous particle-containing liquid as described above. When the microporous particle is a pulverized product of a gelled compound, the pulverized product can be obtained, for example, by pulverizing the gelled compound. By pulverization of the gelled compound, as described above, the three-dimensional structure of the gelled compound is destroyed and dispersed into three-dimensional basic structures.

Generation of the gelled compound by gelation of the monomer compound and preparation of the pulverized product by pulverization of the gelled compound are described below with reference to examples. The present invention, however, is not limited thereto.

The gelation of the monomer compound can be performed, for example, by bonding the monomer compounds by a hydrogen bond or an intermolecular bond.

The monomer compound can be, for example, a silicon compound represented by the chemical formula (1) described in the description as to the void-provided layer of the present invention.

(1)

Since the silicon compound represented by the chemical formula (1) has a hydroxyl group, monomers in the chemical formula (1) can be bonded by a hydrogen bond or an intermolecular bond through their hydroxyl groups, for example.

The silicon compound may be the hydrolysate of the silicon compound precursor as described above, and may be generated by hydrolyzing the silicon compound precursor represented by the chemical formula (2) described in the description as to the void-provided layer of the present invention, for example.

(2)

The method of hydrolyzing the monomer compound precursor is not limited to particular methods, and can be performed by a chemical reaction in the presence of a catalyst, for example. Examples of the catalyst include acids such as an oxalic acid and an acetic acid. The hydrolysis reaction can be performed, for example, by gradually dropping an oxalic acid aqueous solution to a mixture (for example, suspension) of the silicon compound and dimethylsulfoxide to mix at room temperature, and stirring the resultant for about 30 minutes. In hydrolysis of the silicon compound precursor, for example, by completely hydrolyzing the alkoxy group of the silicon compound precursor, gelation and aging thereafter and heating and immobilization after formation of a void-provided structure can be achieved more efficiently.

The gelation of the monomer compound can be performed, for example, by a dehydration condensation reaction among the monomers. The dehydration condensation reaction is preferably performed in the presence of a catalyst, for example. Examples of the catalyst include dehydration condensation catalysts such as: acid catalysts including a hydrochloric acid, an oxalic acid, and a sulfuric acid; and base catalysts (basic catalysts) including ammonia, potassium hydroxide, sodium hydroxide, and ammonium hydroxide. The dehydration condensation catalyst is particularly preferably a base catalyst. In the dehydration condensation reaction, the amount of the catalyst to be added to the monomer compound is not particularly limited, and is, for example, 0.1 to 10 mol, 0.05 to 7 mol, or 0.1 to 5 mol per mol of the monomer compound.

The gelation of the monomer compound is preferably performed in a solvent, for example. The proportion of the monomer compound in the solvent is not particularly limited. Examples of the solvent include dimethylsulfoxide (DMSO), N-methylpyrrolidone (NMP), N,N-dimethylacetamide (DMAc), dimethylformamide (DMF), γ-butyrolactone (GBL), acetonitrile (MeCN), and ethylene glycol ethyl ether (EGEE). One of the solvents may be used alone or two or more of them may be used in combination, for example. Hereinafter, the solvent used for the gelation is also referred to as a "gelation solvent".

The condition for the gelation is not limited to particular conditions. Regarding the treatment of the solvent containing the monomer compound, the treatment temperature is, for example, 20° C. to 30° C., 22° C. to 28° C., or 24° C. to 26° C., and the treatment time is, for example, 1 to 60 minutes, 5 to 40 minutes, or 10 to 30 minutes. The treatment condition for the dehydration condensation reaction is not limited to particular conditions, and reference can be made to these examples. By gelation, a siloxane bond is grown and silica primary particles are formed. As the reaction further proceeds, the primary particles are connected in the form of a string of beads to generate a gel having a three-dimensional structure, for example.

The gelled compound obtained by the gelation is preferably subjected to aging treatment after the gelation reaction. The aging treatment causes further growth of the primary particle of a gel having a three-dimensional structure obtained by gelation, for example, and this allows the size of the particle itself to be increased. As a result, the contact state of the neck where particles are in contact with one another can be increased from a point contact to a surface contact. The gel which has been subjected to the aging treatment improves its strength, for example, and this improves the strength of the three-dimensional basic structure after pulverization. This prevents, in the drying step after coating of the pulverized product, the pore size of the void-provided structure obtained by deposition of the three-dimensional basic structures from shrinking in accordance with solvent volatilization during the drying process, for example.

The aging treatment can be performed, for example, by incubating the gelled compound at a predetermined temperature for a predetermined time. The predetermined temperature is not particularly limited, and the lower limit thereof is, for example, 30° C. or more, 35° C. or more, or 40° C. or more, the upper limit thereof is, for example, 80° C. or less, 75° C. or less, or 70° C. or less, and the predetermined temperature is, for example, in the range from 30° C. to 80° C., 35° C. to 75° C., or 40° C. to 70° C. The predetermined time is not particularly limited, and the lower limit is, for example, 5 hours or more, 10 hours or more, or 15 hours or more, the upper limit is, for example, 50 hours or less, 40 hours or less, or 30 hours or less, and the predetermined time is, for example, in the range from 5 hours to 50 hours, 10 hours to 40 hours, or 15 hours to 30 hours. An optimal condition for the aging is, for example, the condition mainly aiming for increase in the size of the silica primary particle and increase in the contact area of the neck. Furthermore, it is preferable to take the boiling point of a solvent to be used into consideration. For example, when the aging temperature is too high, there is a possibility that the solvent excessively volatilizes, which causes defectiveness such that the pore of the three-dimensional void-provided structure closes due to the condensation of the concentration of a coating liquid (gel liquid). On the other hand, for example, when the aging temperature is too low, there is a possibility not only that a sufficient effect of the aging is not brought about but also that temperature variations over time in a mass production process increase, which causes products with poor quality to be produced.

The same solvent as the solvent used in the gelation treatment can be used in the aging treatment, for example. Specifically, the aging treatment is preferably applied to a reactant (the solvent containing the gelled compound) after the gelation treatment. The mol number of residual silanol groups contained in the gel (the gelled compound, for example, the gelled silicon compound) after completion of the aging treatment after gelation is, for example, the proportion of the residual silanol group with the mol number of alkoxy groups of the added raw material (for example, the monomer compound precursor) being considered as 100, and the lower limit thereof is, for example, 1% or more, 3% or more, or 5% or more, the upper limit thereof is, for example, 50% or less, 40% or less,30% or less, and the mol number is, for example, in the range from 1% to 50%, 3% to 40%, or 5% to 30%. For the purpose of improving the hardness of a gel, for example, the lower the mol number of the residual silanol groups, the better. When the mol number of the silanol groups is too high, for example, there is a possibility that the void-provided structure cannot be held until crosslinking is done in the precursors of the silicone porous body. On the other hand, when the mol number of the silanol groups is too low, for example, there is a possibility that the pulverized products of the gelled compound cannot be crosslinked in a step of preparing the liquid containing microporous particles (for example, suspension) and/or subsequent steps, which hinders a sufficient film strength from being imparted. Note that while the aforementioned description is described with reference to a silanol group as an example, the same phenomenon shall be applied to various functional groups in the case where a monomer silicon compound is modified with various reactive functional groups, for example.

After gelation of the monomer compound in the gelation solvent, the obtained gelled compound is pulverized. The gelled compound in the gelation solvent which has not been processed may be pulverized or the gelation solvent may be substituted with another solvent and the gelled compound in the substituted solvent may be pulverized, for example. Furthermore, if the catalyst and solvent used in the gelation reaction remain after the aging step, which causes gelation of the liquid over time (pot life) and decreases the drying efficiency in the drying step, it is preferable to substitute the gelation solvent with another solvent. Hereinafter, such a solvent for substitution may be also referred to as a "pulverization solvent".

The pulverization solvent is not limited to particular solvents, and can be, for example, an organic solvent. The organic solvent can be, for example, a solvent having a boiling point at 130° C. or less, 100° C. or less, or 85° C. or less. Specific examples of the organic solvent include isopropyl alcohol (IPA), ethanol, methanol, butanol, propylene glycol monomethyl ether (PGME), methyl cellosolve, acetone, and dimethylformamide (DMF). One of the pulverization solvents may be used alone or two or more of them may be used in combination.

The combination of the gelation solvent and the pulverization solvent is not limited to particular combinations, and the combination can be, for example, the combination of DMSO and IPA, the combination of DMSO and ethanol, the combination of DMSO and methanol, and the combination of DMSO and butanol. Substitution of the gelation solvent with the pulverization solvent makes it possible to form a coating film with uniform quality in the coating film formation described below, for example.

The method of pulverizing the gelled compound is not limited to particular methods. Examples of the apparatus for pulverizing include: pulverizing apparatuses utilizing a cavitation phenomenon such as an ultrasonic homogenizer and a high-speed rotating homogenizer; and pulverizing apparatuses of causing oblique collision of liquids at a high pressure. An apparatus such as a ball mill that performs media pulverization physically destroys the void-provided structure of a gel in pulverization, for example. On the other hand, a cavitation-type pulverizing apparatus such as a homogenizer, which is preferable in the present invention, peels the contact surface of silica particles, which are already contained in a gel three-dimensional structure and bonded relatively weakly, with a high speed shearing force owing to a media-less method, for example. Thus, a sol three-dimensional structure to be obtained can hold the void-provided structure having a particle size distribution of a certain range and can form the void-provided structure again by deposition in coating and drying, for example. The condition for the pulverization is not limited to particular conditions, and is preferably a condition that allows a gel to be pulverized without volatilizing a solvent by instantaneously imparting a high speed flow, for example. For example, it is preferable to pulverize the gelled silicon compound so as to obtain pulverized products having the above described particle size variations (for example, volume average particle size or particle size distribution). If the pulverization time, the pulverization strength, or the like is lacking, for example, there is a possibility not only that coarse particles remain, which hinders dense pores from being formed but also that defects in appearance increase, which hinders high quality from being achieved. On the other hand, if the pulverization time, the pulverization strength, or the like is too much, for example, there is a possibility that a finer sol particle than a desired particle size distribution is obtained and the size of a void space deposited after coating and drying is too fine to satisfy a desired porosity.

In the manner described above, a liquid (for example, suspension) containing the microporous particles (pulverized products of a gelled compound) can be prepared. By further adding a catalyst for chemically bonding the microporous particles after or during the preparation of the liquid containing the microporous particles, a liquid containing the microporous particles and the catalyst can be prepared. The amount of the catalyst to be added is not particularly limited, and the amount of the catalyst to be added relative to the weight of the microporous particle (pulverized product of the gelled compound) is, for example, in the range from 0.01 wt % to 20 wt %, 0.05 wt % to 10 wt %, or 0.1 wt % to 5 wt %. This catalyst may be a catalyst (crosslinking reaction accelerator) that accelerates the crosslinking bond among the microporous particles, for example. As the chemical reaction of chemically bonding the microporous particles, it is preferable to utilize the dehydration condensation reaction of a residual silanol group contained in a silica sol molecule. By accelerating the reaction between the hydroxyl groups of the silanol group by the catalyst, the continuous formation of a film in which the void-provided structure is cured in a short time can be performed. Examples of the catalyst include photoactive catalysts and thermoactive catalysts. The photoactive catalyst allows the chemical bond (for example, crosslinking bond) among the microporous particles without heating in the precursor forming step, for example. This makes it possible to maintain a higher proportion of void space because the shrinkage of the whole precursor in the precursor forming step is less liable to occur, for example. In addition to or instead of the catalyst, a substance (catalyst generator) that generates a catalyst may be used. The catalyst may be a crosslinking reaction accelerator, and the catalyst generator may be a substance that generates the crosslinking reaction accelerator, for example. For example, in addition to or instead of the photoactive catalyst, a substance (photocatalyst generator) that generates a catalyst by light irradiation may be used. For example, in addition to or instead of the thermoactive catalyst, a substance (thermal catalyst generator) that generates a catalyst by heating may be used. The photocatalyst generator is not limited to particular photocatalyst generators, and examples thereof include photobase generators (substances that generate basic catalysts by light irradiation) and photoacid generators (substances that generate acidic catalysts by light irradiation). Among them, the photobase generator is preferable. Examples of the photobase generator include 9-anthrylmethyl N,N-diethylcarbamate (product name: WPBG-018), (E)-1-[3-(2-hydroxyphenyl)-2-propenoyl]piperidine (product name: WPBG-027), 1-(anthraquinon-2-yl)ethyl imidazolecarboxylate (product name: WPBG-140), 2-nitrophenylmethyl 4-methacryloyloxypiperidine-1-carboxylate (product name: WPBG-165), 1,2-diisopropyl-3-[bis(dimethylamino) methylene]guanidium 2-(3-benzoylphenyl)propionate (product name: WPBG-266), 1,2-dicyclohexyl-4,4,5, 5-tetramethylbiguanidium n-butyltriphenylborate (product name: WPBG-300), 2-(9-oxoxanthen-2-yl)propionic acid 1,5,7-triazabicyclo[4.4.0] dec-5-ene (Tokyo Kasei Kogyo Co., Ltd.), and a compound containing 4-piperidinemethanol (product of Heraeus, product name: HDPD-PB100). Note here that each product with the name including "WPBG" is a product of Wako Pure Chemical Industries, Ltd. Examples of the photoacid generator include aromatic sulfonium salt (product of ADEKA, product name: SP-170), triarylsulfonium salt (product of San-Apro Ltd., product name: CPI101A), and aromatic iodonium salt (product of Ciba Japan, product name: Irgacure 250). The catalyst for chemically bonding the microporous particles is not limited to the photoactive catalyst and the photocatalyst generator, and can be, for example, a thermoactive catalyst or a thermal catalyst generator such as urea. Examples of the catalyst for chemically bonding the microporous particles include base catalysts such as potassium hydroxide, sodium hydroxide, and ammonium hydroxide; and acid catalysts such as a hydrochloric acid, an acetic acid, and an oxalic acid. Among them, the base catalyst is preferable. The catalyst or the catalyst generator for chemically bonding the microporous particles can be used by adding it to a sol particle liquid (for example, suspension) containing the pulverized products (microporous particles) right before the coating, or the catalyst or the catalyst generator can be used as a mixture by mixing it with a solvent, for example. The mixture may be, for example, a coating liquid obtained by adding the catalyst or the catalyst generator directly to the sol particle liquid, a solution obtained by dissolving the catalyst or the catalyst generator in a solvent, or a dispersion liquid obtained by dispersing the catalyst or the catalyst generator into a solvent. The solvent is not limited to particular solvents, and examples thereof include water and buffer solutions.

For example, in the case where the microporous particle is a pulverized product of a gelled silicon compound obtained from a silicon compound containing at least three or less functional groups having saturated bonds, a crosslinking assisting agent for indirectly bonding the microporous particles may further be added after or during preparation of a liquid containing the microporous particles. This crosslinking assisting agent penetrates among particles and interacts with or bonds to the particles, which helps particles relatively distanced from one another to be bonded and makes it possible to increase the strength efficiently. As the crosslinking assisting agent, a multi-crosslinking silane monomer is preferable. Specifically, the multi-crosslinking silane monomer may have at least two and at most three alkoxysilyl groups, the chain length between the alkoxysilyl groups may be 1-10 C, and the multi-crosslinking silane monomer may contain an element other than carbon, for example. Examples of the crosslinking assisting agent include 1,2-bis(trimethoxysilyl)ethane, 1,2-bis(triethoxysilyl)ethane, bis(trimethoxysilyl)methane, bis(triethoxysilyl)methane, 1.3-bis(triethoxysilyl)propane, 1.3-bis(trimethoxysilyl)propane, 1.4-bis(triethoxysilyl)butane, 1.4-bis(trimethoxysilyl)butane, 1.5-bis(triethoxysilyl)pentane, 1.5-bis(trimethoxysilyl)pentane, 1.6-bis(triethoxysilyl)hexane, 1.6-bis(trimethoxysilyl)hexane, bis(trimethoxysilyl)-N-butyl-N-propyl-ethane-1,2-diamine, tris-(3-trimethoxysilylpropyl)isocyanurate, and tris-(3-triethoxysilylpropyl)isocyanurate. Among them, 1,2-bis(trimethoxysilyNthane or 1,6-bis(trimethoxysilyl)hexane is particularly preferable. The amount of the crosslinking assisting agent to be added is not particularly limited, and the amount of the crosslinking assisting agent to be added relative to the weight of the silicon compound microporous particle is, for example, in the range from 0.01 wt % to 20 wt %, 0.05 wt % to 15 wt %, or 0.1 wt % to 10 wt %.

Subsequently, a resin film (hereinafter, also referred to as a "base") is coated with the liquid containing the microporous particles (for example, suspension) (coating step). The coating can be performed, for example, by the various coating methods described below but not limited thereto. By directly coating the resin film with the liquid containing the microporous particles (for example, pulverized products of a gelled silica compound), a coating film containing the microporous particles and the catalyst can be formed. The coating film can also be referred to as a coating layer, for example. Formation of the coating film causes the settlement and deposition of the pulverized product whose three-dimensional structure has been destroyed, for example, and this allows a new three-dimensional structure to be formed. Note that the microporous particle-containing liquid may not contain a catalyst for chemically bonding the microporous particles, for example. For example, as described below, the precursor forming step may be performed after the catalyst has been sprayed to the coating film or while spraying the catalyst to the coating film. On the other hand, the microporous particle-containing liquid may contain a catalyst for chemically bonding the microporous particles, and the precursor of the porous body may be formed by chemically bonding the microporous particles by the catalysis of the catalyst contained in the coating film.

The solvent (hereinafter, also referred to as a "coating solvent") is not limited to particular solvents, and can be, for example, an organic solvent. The organic solvent can be, for example, a solvent having a boiling point at 150° C. or less. Specific examples of the solvent include IPA, ethanol, methanol, n-butanol, 2- butanol, isobutyl alcohol, and pentanol, and the examples of the pulverization solvent described above can be used. In the case where the present invention includes a step of pulverizing the gelled compound, for example, the pulverization solvent containing the pulverized products of the gelled compound can be used without processing in the step of forming the coating film.

In the coating step, for example, it is preferable to coat the base with the sol pulverized products dispersed in the solvent (hereinafter, also referred to as a "sol particle liquid"). After coating the base with the sol particle liquid of the present invention and drying it, by chemically crosslinking the particles, the continuous formation of a void-provided layer having a film strength of a certain level or more can be performed. The "sol" in the present invention denotes a fluidic state in which silica sol particles each having a nano three-dimensional structure holding a part of the void-provided structure are dispersed in a solvent by pulverization of the three-dimensional structure of a gel.

The concentration of the pulverized product in the solvent is not particularly limited, and is, for example, in the range from 0.3% to 50% (v/v), 0.5% to 30% (v/v), or 1.0% to 10% (v/v). When the concentration of the pulverized product is too high, there is a possibility that the fluidity of the sol particle liquid decreases significantly, which causes aggregates and coating stripes in coating, for example. On the other hand, when the concentration of the pulverized product is too low, there is a possibility not only that the drying of the sol particle solvent takes a relatively long time but also that the residual solvent right after the drying increases, which may decrease the porosity, for example.

There is no particular limitation on the physical property of the sol. The shear viscosity of the sol is, for example, 100 cPa·s or less, 10 cPa·s or less, or 1 cPa·s or less, for example, at the shear rate of 10001/s. When the shear viscosity is too high, for example, there is a possibility that the coating stripes are generated, which causes defectiveness such as decrease in the transfer rate in the gravure coating. In contrast, when the shear viscosity is too low, for example, there is a possibility that the thickness of the wet coating (coating) during coating cannot be increased and a desired thickness cannot be obtained after drying.

The coating amount of the pulverized product relative to the base is not particularly limited, and can be determined appropriately, for example, according to the thickness of a desired silicone porous body. As a specific example, in the case of forming the silicone porous body having a thickness of 0.1 µm to 1000 µm, the coating amount of the pulverized product relative to the base is, for example, in the range from 0.01 µg to 60000 µg, 0.1 µg to 5000 µg, or 1 µg to 50 µg per square meter of the base. Although it is difficult to uniquely define a preferable coating amount of the sol particle liquid because it depends on the concentration of a liquid, the coating method, or the like, for example, it is preferable that a coating layer is as thin as possible in consideration of productivity. When the coating amount (application amount) is too much, for example, there is a high possibility that a solvent is dried in a drying oven before volatilizing. When the solvent is dried before forming the void-provided structure by the settlement and deposition of the nano pulverized sol particles in the solvent, there is a possibility that formation of void spaces is inhibited and the proportion of void space decreases. On the other hand, when the coating amount is too little, there is a possibility of increasing the risk of causing coating cissing due to unevenness of a base, variations in hydrophilicity and hydrophobicity, and the like.

Furthermore, for example, the production method of the present invention includes a step of forming a void-provided structure, which is the precursor of the void-provided layer on the resin film as described above. The precursor forming step is not particularly limited, and, for example, the precursor (void-provided structure) may be formed by a drying step of drying the coating film produced by applying the microporous particle-containing liquid. The drying treatment in the drying step is aimed not only for removing the solvent (solvent contained in the sol particle liquid) from the precursor of the coating film but also for causing the settlement and deposition of the sol particles to form a void-provided structure in the drying treatment, for example. The temperature for the drying treatment is, for example, in the range from 50° C. to 250° C., 60° C. to 150° C., or 70° C. to 130° C., and the time for the drying treatment is, for example, in the range from 0.1 minutes to 30 minutes, 0.2 minutes to 10 minutes, or 0.3 minutes to 3 minutes. Regarding the temperature and time for the drying treatment in relation to continuous productivity and high porosity expression, the lower the better and the shorter the better, for example. When the condition is too strict, there is a possibility of causing the following problems, for example. That is, when the base is a resin film, for example, the base extends in a drying oven as the temperature approaches the glass-transition temperature of the base, which causes defects such as cracks in a formed void-provided structure right after coating. On the other hand, when the condition is too mild, there is a possibility of causing the following problems, for example. That is, since the film contains a residual solvent when it comes out of the drying oven, defects in appearance such as scratches are caused when the film rubs against a roller in the next step.

The drying treatment may be, for example, natural drying, drying by heating, or drying under reduced pressure. The drying method is not limited to particular methods, and a common heating unit can be used, for example. Examples of the heating unit include a hot air fan, a heating roll, and a far-infrared heater. Among them, in view of performing continuous production industrially, drying by heating is preferable. The solvent to be used is preferably a solvent having a low surface tension in view of reducing the shrinkage stress in accordance with the solvent volatilization in drying and reducing the crack phenomenon of the void-provided layer (the silicone porous body) due to the shrinkage stress. The solvent can be, for example, lower alcohol typified by isopropyl alcohol (IPA), hexane, perfluorohexane, and the like. The solvent, however, is not limited thereto. The surface tension may be reduced by adding a small amount of a perfluoro surfactant or a small amount of a silicon surfactant to the IPA and the like.

Furthermore, as described above, the production method of a laminated film of the present invention includes a crosslinking reaction step of causing a crosslinking reaction in the precursor after the precursor forming step. The crosslinking reaction accelerator is generated by light irradiation or heating in the crosslinking reaction step having multiple stages. At the first stage of the crosslinking reaction step, for example, the microporous particles are chemically bonded by the crosslinking reaction accelerator (for example, acidic substance or basic substance). Thereby, the three-dimensional structure of the pulverized product in the coating film (precursor) is immobilized, for example. In the case of immobilizing the three-dimensional structure by conventional sintering, for example, the dehydration condensation of a silanol group and the formation of a siloxane bond are induced by high temperature treatment at 200° C. or more. In the present invention, for example, the void-provided structure can be formed and immobilized continuously at about 100° C. which is relatively low for less than several minutes which is short without damaging the base (resin film) by causing various additives, which catalyze the dehydration condensation reaction, to react.

The method of chemically bonding the particles is not limited to particular methods, and can be determined appropriately according to the type of the gelled silicon compound, for example. Specifically, for example, the chemical bond can be a chemical crosslinking bond among the pulverized products. Besides this, for example, when inorganic particles such as titanium oxide particles are added to the pulverized products, the inorganic particles and the pulverized products can be chemically bonded by crosslinking. Furthermore, there are a case of using a biocatalyst such as an enzyme and a case of chemically crosslinking the pulverized product and a catalyst at a site which is different from a catalytic activity site. Thus, the present invention can be applied not only to a void-provided layer (silicone porous body) formed of the sol particles but also to an organic-inorganic hybrid void-provided layer, a host-guest void-provided layer, and the like, for example. The present invention, however, is not limited thereto.

It is not particularly limited at which stage the chemical reaction in the presence of the catalyst (crosslinking reaction accelerator) is performed (caused) in the production method of the present invention, and, for example, the chemical reaction is performed at at least one stage of the multiple stages of the crosslinking reaction step. For example, as described above, in the production method of a laminated film of the present invention, the drying step may also serve as the precursor forming step. Furthermore, for example, the crosslinking reaction step having multiple stages may be performed after the drying step, and the microporous particles may be chemically bonded by the catalysis of the catalyst at at least one of the stages. For example, as described above, the catalyst (crosslinking reaction accelerator) may be a photoactive catalyst, and the microporous particle may be chemically bonded by light irradiation in the crosslinking reaction step. Furthermore, the catalyst may be a thermoactive catalyst, and the microporous particles may be chemically bonded by heating in the crosslinking reaction step.

The chemical reaction can be performed, for example, by heating the coating film containing the catalyst generator (substance that generates crosslinking reaction accelerator) preliminarily added to the sol particle liquid (for example, suspension) or irradiating the coating film containing the catalyst generator (substance that generates crosslinking reaction accelerator) preliminarily added to the sol particle liquid with light, by heating the coating film or irradiating the coating film with light after the catalyst generator (substance that generates crosslinking reaction accelerator) has been sprayed to the coating film, or by heating the coating film or irradiating the coating film with light while spraying the catalyst generator (substance that generates crosslinking reaction accelerator) to the coating film. The accumulated light amount in the light irradiation is not particularly limited, and is, for example, in the range from 200 to 800 mJ/cm$^2$, 250 to 600 mJ/cm$^2$, or 300 to 400 mJ/cm$^2$ in terms of the wavelength at 360 nm. From the view point of preventing the effect from being insufficient due to the delay of decomposition of the catalyst generator by light absorption because of insufficient irradiation amount, the accumulated light amount is preferably 200 mJ/cm$^2$ or more. From the view point of preventing heat wrinkles from generating due to the damage on a base below a void-provided layer, the accumulated light amount is preferably 800 mJ/cm$^2$ or less. The conditions for the heat treatment are not limited to particular conditions. The heating temperature is, for example, 50° C. to 250° C., 60° C. to 150° C., or 70° C. to 130° C., the heating time is, for example, 0.1 to 30 minutes, 0.2 to 10 minutes, or 0.3 to 3 minutes. The step of drying the sol particle liquid (for example, suspension) may also serve as a step of performing a chemical reaction in the presence of the catalyst as described above. That is, in the step of drying the sol particle liquid (for example, suspension), the pulverized products (microporous particles) may be chemically bonded in the presence of the catalyst. In this case, by further heating the coating film after the drying step, the pulverized products (microporous particles) may be bonded more firmly. It is presumed that the chemical reaction in the presence of the catalyst may be caused also in the step of preparing the liquid (for example, suspension) containing the microporous particles and the step of coating the resin film with the liquid containing microporous particles. This presumption, however, does not limit the present invention by any means. The solvent to be used is preferably a solvent having a low surface tension in view of reducing the shrinkage stress in accordance with the solvent volatilization in drying and reducing the crack phenomenon of the void-provided layer due to the shrinkage stress, for example. The solvent can be, for example, lower alcohol typified by isopropyl alcohol (IPA), hexane, perfluorohexane, or the like. The solvent, however, is not limited thereto.

Since the crosslinking reaction step of the present invention has multiple stages, for example, the strength of the void-provided layer can be further improved as compared to the crosslinking reaction step having one stage. Hereinafter, the stages of the crosslinking reaction step from the second stage may be also referred to as an "aging step". In the aging step, for example, by heating the precursor, a crosslinking reaction may be further accelerated in the precursor. While the phenomenon observed in the crosslinking reaction step and the mechanism of the crosslinking reaction step are unknown, they can be as described above, for example. For example, in the aging step, by setting a heating temperature at a low temperature, for example, a crosslinking reaction can be caused without restricting the shrinkage of the precursor, thereby improving the strength. Thus, both a high proportion of void space and a high strength can be achieved. The temperature of the aging step is, for example, 40° C. to 70° C., 45° C. to 65° C., or 50° C. to 60° C. The time for the aging step is, for example, 10 to 30 hours, 13 to 25 hours, or 15 to 20 hours.

The laminated film of the present invention can be produced in the manner as described above. Owing to its superior strength, for example, the laminated film produced by the production method of the present invention can be a porous body in the form of a roll, which brings about advantageous effects such as superior manufacturing efficiency, superior handleability, and the like.

The thus obtained laminated film (void-provided layer) of the present invention may further be stacked on another film (layer) to form a laminate having the porous structure, for example. In this case, the components of the laminate may be stacked through a pressure-sensitive adhesive or an adhesive, for example.

The components may be laminated by continuous treatment (so called Roll to Roll) using a long film, for example, in terms of efficiency. When the base is a molded product, an element, or the like, the base that has been subjected to a batch process may be laminated.

The method of forming a void-provided layer of the present invention on a base (resin film) is described below with reference to a continuous treatment process using FIGS. 1 to 3 as an example. FIG. 2 shows a step of adhering a protective film to a formed silicone porous body and winding the laminate. In the case of forming the silicone porous body on another functional film, the aforementioned method may be adopted or the formed silicone porous body may be adhered to another functional film that has been coated and dried, right before winding. The method of forming a film shown in FIG. 2 is an example, and the present invention is not limited thereto.

The base may be the resin film described in the description as to the void-provided layer of the present invention. In this case, the void-provided layer of the present invention can be obtained by forming the void-provided layer on the base. The void-provided layer of the present invention can be obtained also by forming the void-provided layer on the base and then stacking the void-provided layer with the base on the resin film described in the description as to the void-provided layer of the present invention.

Figure 2:
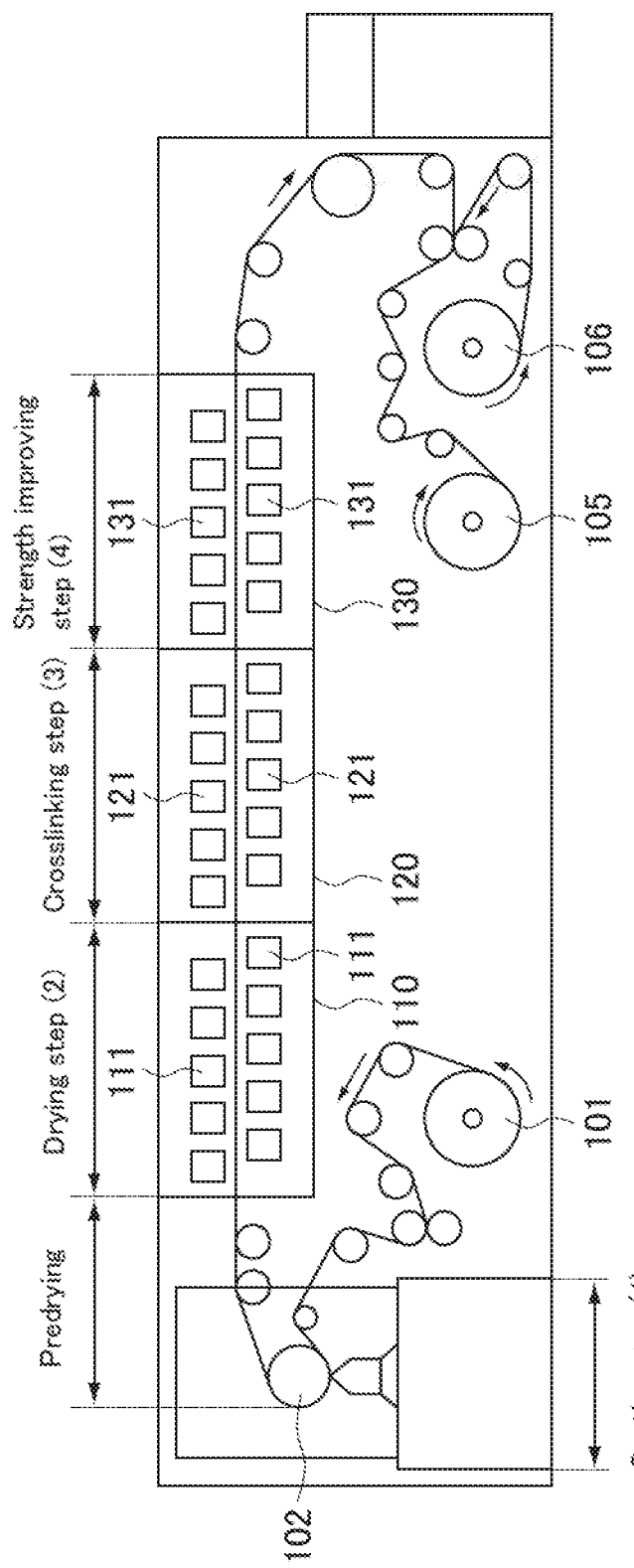
FIG. 2 is an illustration schematically showing an example of a part of the process of producing a rolled laminated film of the present invention (hereinafter, also referred to as "a laminated film roll of the present invention") and an example of the apparatus used therefore.

FIG. 1 is a cross sectional view schematically showing an example of the process of forming the void-provided layer on the base (resin film) in the present invention. In FIG. 1, the method of forming the void-provided layer includes: (1) a coating step of coating a base (resin film) 10 with a sol particle liquid 20" containing pulverized products of a gelled compound; (2) a drying step of drying the sol particle liquid 20" to form a dried coating film (precursor of void-provided layer) 20'; (3) a crosslinking step of applying crosslinking treatment to the coating film 20' to form a crosslinked precursor (void-provided layer) 20; and (4) a strength improving step (aging step) of improving the peel strength of the crosslinked precursor 20 to the base 10 to form a void-provided layer (void-provided layer having a higher strength) 21. In the manner described above, the void-provided layer 21 can be formed on the base 10 as shown in FIG. 1. In this production method, the (2) drying step corresponds to the "precursor forming step" in the production method of a laminated film of the present invention. In the (3) crosslinking step and the (4) strength improving step (aging step), the crosslinking reaction is caused in the precursor. In other words, the two stages, namely the (3) crosslinking step and the (4) strength improving step (aging step), correspond to the "crosslinking reaction step" in the production method of a laminated film of the present invention. The method of forming the void-provided layer may include steps other than the steps (1) to (4) appropriately.

In the (1) coating step, the method of coating the base with the sol particle liquid 20" is not limited to particular methods, and a common method can be adopted. Examples of the method include a slot die method, a reverse gravure coating method, a micro-gravure method (micro-gravure coating method), a dip method (dip coating method), a spin coating method, a brush coating method, a roller coating method, a flexography method, a wire-bar coating method, a spray coating method, an extrusion coating method, a curtain coating method, and a reverse coating method. Among them, from the viewpoint of productivity, smoothness of a coating film, and the like, an extrusion coating method, a curtain coating method, a roller coating method, a micro-gravure coating method, and the like are preferable. The coating amount of the sol particle liquid 20" is not particularly limited, and can be determined appropriately so as to obtain a void-provided layer 20 having an appropriate thickness, for example. The thickness of the void-provided layer 21 is not particularly limited, and is, for example, as described above.

In the (2) drying step, the sol particle liquid 20" is dried (i.e., dispersion medium contained in sol particle liquid 20" is removed) to form a dried coating film 20'. The condition for the drying treatment is not limited to particular conditions, and is as described above.

In the (3) chemical treatment step, the coating film 20' containing the catalyst generator (a substance that generates a catalyst (a crosslinking reaction accelerator), e.g., a photocatalyst generator or a thermal catalyst generator) which has been added before coating is irradiated with light or heated to chemically bond (for example, crosslink) the pulverized products in the coating film 20', thereby forming a crosslinked precursor 20. The conditions for the light irradiation and heating in the (3) chemical treatment step are not limited to particular conditions, and are as described above.

The (4) strength improving step (aging step) is performed, for example, by heating the crosslinked precursor 20 to form a void-provided layer 21. The heating condition in the (4) strength improving step (aging step) is not particularly limited and is as described above.

FIG. 2 schematically shows an example of a slot die coating apparatus and an example of the method of forming a void-provided layer using the same. Although FIG. 2 is a cross sectional view, hatching is omitted for viewability.

As shown in FIG. 2, the steps of the method using this apparatus are carried out while carrying a base 10 in one direction by rollers. The carrying speed is not particularly limited, and is, for example, in the range from 1 to 100 m/min, 3 to 50 m/min, or 5 to 30 m/min.

First, the base 10 is delivered from a delivery roller 101 and carried to a coating roller 102, and the (1) coating step of coating the base 10 with a sol particle liquid 20" is carried out using the coating roller 102. Subsequently, the (2) drying step is carried out in an oven zone 110. In the coating apparatus shown in FIG. 2, a predrying step is carried out after the (1) coating step and before the (2) drying step. The predrying step can be carried out at room temperature without heating. In the (2) drying step, a heating unit 111 is used. As the heating unit 111, as described above, a hot air fan, a heating roll, a far-infrared heater, or the like can be used appropriately. For example, the (2) drying step may be divided into multiple steps, and the drying temperature may be set higher as coming to later steps.

The (3) chemical treatment step is carried out in a chemical treatment zone 120 after the (2) drying step. In the (3) chemical treatment step, for example, when the coating film (precursor) 20' after drying contains a photocatalyst generator, light is emitted from lamps (light irradiation units) 121 disposed above and below the base 10. On the other hand, for example, when the coating film 20' after drying contains a thermal catalyst generator, the base 10 is heated using hot air fans 121 disposed above and below the base 10 instead of using the lamps (light irradiation devices) 121. By this crosslinking treatment, the pulverized products in the coating film 20' are chemically bonded, and the precursor 20' is cured and strengthened, thereby forming the crosslinked precursor 20 (hereinafter, may be simply referred to as the "precursor"). Note that, although the (3) chemical treatment step is performed after the (2) drying step in the present example, as described above, there is no particular limitation at which stage in the production method of the present invention the chemical bond among the pulverized products is caused. For example, as described above, the (2) drying step may also serve as the (3) chemical treatment step. Even when the chemical bond is caused in the (2) drying step, the (3) chemical treatment step may be performed to make the chemical bond among the pulverized products firmer. Furthermore, in the steps (for example, predrying step, the (1) coating step, step of preparing a coating liquid (for example, suspension), and the like) before the (2) drying step, the chemical bond among the pulverized products may be caused.

After the (3) chemical treatment step, the (4) strength improving step (aging step) is performed in a crosslinking reaction zone (aging zone) 130 to improve the strength (for example, peel strength) of the precursor 20 of the void-provided layer to the resin film 10, thereby forming the void-provided layer 21. The (4) strength improving step (aging step) may be performed by heating the precursor 20 using hot air fans (heating units) 131 disposed above and below the base 10, for example. The heating temperature, the time, and the like are not particularly limited, and can be, for example, as described above.

After the (4) strength improving step (aging step), a laminate in which the void-provided layer 21 is formed on the base 10 is wound by a winding roller 105. In FIG. 2, the void-provided layer 21, which is a laminate, is protected by coating with a protecting sheet delivered from a roller 106. Instead of the protecting sheet, another layer formed of a long film may be stacked on the void-provided layer 21.

Figure 3:
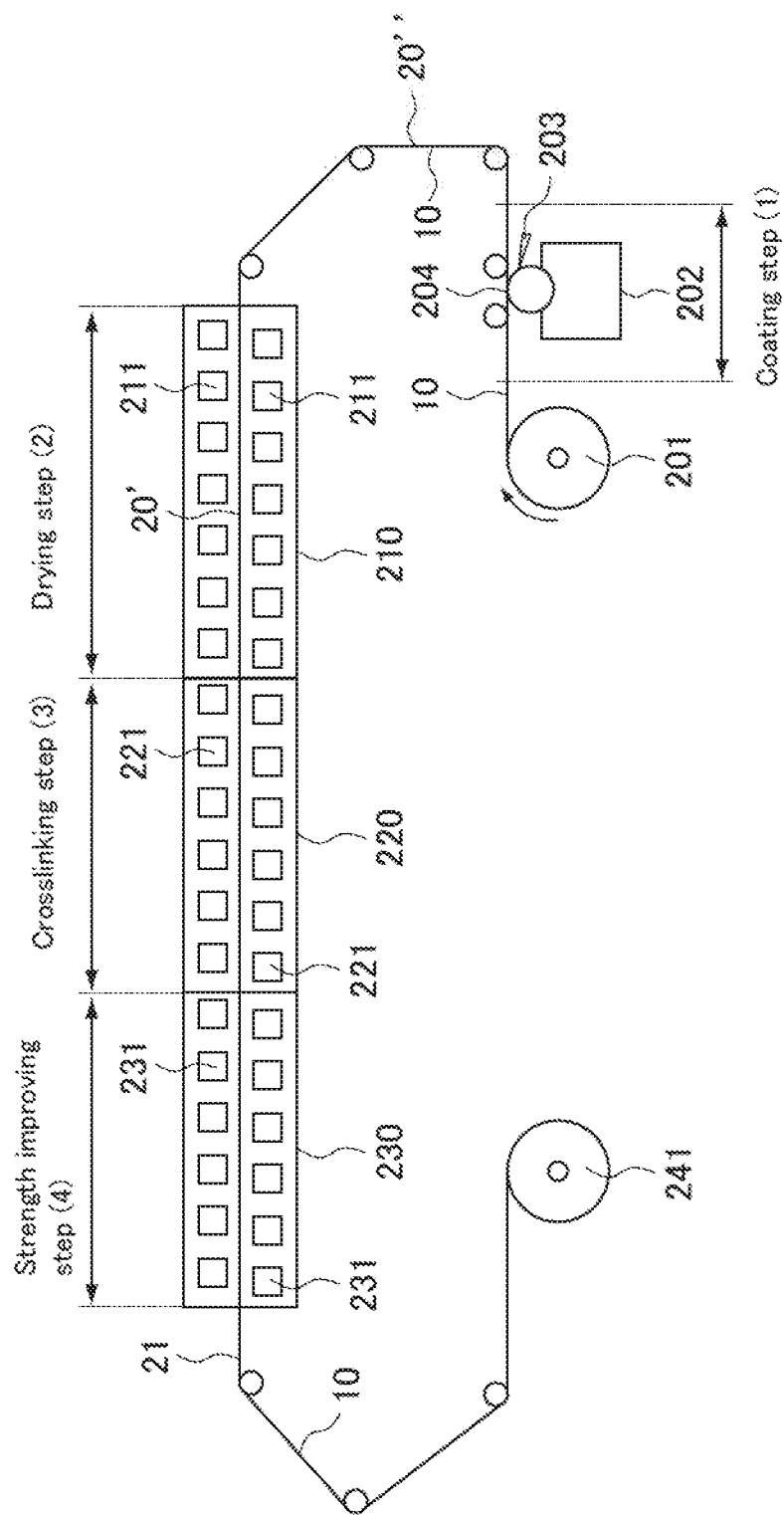
FIG. 3 is an illustration schematically showing another example of a part of the process of producing a laminated film roll of the present invention and another example of the apparatus used therefore.

FIG. 3 schematically shows an example of a micro-gravure coating apparatus and an example of the method of forming a void-provided layer using the same. Although FIG. 3 is a cross sectional view, hatching is omitted for viewability.

As shown in FIG. 3, the steps of the method using this apparatus are carried out while carrying the base 10 in one direction by rollers as in FIG. 2.

The carrying speed is not particularly limited, and is, for example, in the range from 1 to 100 m/min, 3 to 50 m/min, or 5 to 30 m/min.

First, the (1) coating step of coating the base 10 with a sol particle liquid 20" is carried out while carrying the base 10 delivered from a delivery roller 201. As shown in FIG. 3, the coating with the sol particle liquid 20" is performed using a liquid reservoir 202, a doctor (doctor knife) 203, and a micro-gravure 204. Specifically, the sol particle liquid 20' in the liquid reservoir 202 is applied to the surface of the micro-gravure 204 and the coating of the surface of the base 10 is performed using the micro-gravure 204 while controlling the thickness to a predetermined thickness using a doctor 203. The micro-gravure 204 is merely an illustrative example. The present invention is not limited thereto, and any other coating unit may be adopted.

Subsequently, the (2) drying step is performed. Specifically, as shown in FIG. 3, the base 10 coated with the sol particle liquid 20" is carried into an oven zone 210 and the sol particle liquid 20" is dried by heating using heating units 211 disposed in the oven zone 210. The heating units 211 can be, for example, the same as those shown in FIG. 2. For example, the (2) drying step may be divided into multiple steps by dividing the oven zone 210 into multiple sections, and the drying temperature may be set higher as coming to later steps. The (3) chemical treatment step is carried out in a chemical treatment zone 220 after the (2) drying step. In the (3) chemical treatment step, for example, when the coating film 20' after drying contains a photocatalyst generator, light is emitted from lamps (light irradiation units) 221 disposed above and below the base 10. On the other hand, for example, when the coating film 20' after drying contains a thermal catalyst generator, the base 10 is heated using hot air fans (heating units) 221 disposed above and below the base 10 instead of using lamps (light irradiation devices) 221. By this crosslinking treatment, the pulverized products in the coating film 20' are chemically bonded, and the precursor 20 of the void-provided layer is formed.

After the (3) chemical treatment step, the (4) strength improving step (aging step) is performed in a crosslinking reaction zone (aging zone) 230 to improve the peel strength of the precursor 20 of the void-provided layer to the resin film 10, thereby forming the void-provided layer 21. The (4) strength improving step (aging step) may be performed by heating the precursor 20 using hot air fans (heating units) 231 disposed above and below the base 10, for example. The heating temperature, the time, and the like are not particularly limited, and can be, for example, as described above.

After the (4) strength improving step (aging step), a laminated film in which the void-provided layer 21 is formed on the base 10 is wound by a winding roller 241. Thereafter, for example, another layer may be stacked on the laminated film. Furthermore, another layer may be stacked on the laminated film before winding the laminate by the winding roller 241, for example.

[2. Optical Element]

The optical element of the present invention is characterized in that it includes the laminated film of the present invention as described above. The optical element of the present invention is characterized in that it includes the laminated film of the present invention, and other configurations are by no means limited. The optical element of the present invention may further include another layer besides the laminated film of the present invention, for example.

Furthermore, the optical element of the present invention includes the laminated film of the present invention as a low reflective layer, for example. The optical element of the present invention may further include another layer besides the laminated film of the present invention, for example. The optical element of the present invention is, for example, in the form of a roll.

EXAMPLES

The examples of the present invention are described below. The present invention, however, is not limited by the following examples.

Example 1

In the present example, a laminated film (laminated film roll) of the present invention was produced as described below.

(1) Gelation of Silicon Compound 0.95 g of MTMS which is the precursor of a silicon compound was dissolved in 2.2 g of DMSO. 0.5 g of 0.01 mol/L oxalic acid aqueous solution was added to the mixture, and the resultant was stirred at room temperature for 30 minutes to hydrolyze MTMS, thereby preparing tris(hydroxy)methylsilane.

0.38 g of ammonia water having a concentration of 28% and 0.2 g of pure water were added to 5.5 g of DMSO, then the aforementioned mixture that had been subjected to the hydrolysis treatment was added thereto, and the resultant was stirred at room temperature for 15 minutes to gelate tris(hydroxy)methylsilane, thereby obtaining a gelled silicon compound.

(2) Aging Treatment

The aging treatment was carried out as follows. The mixture that had been subjected to the gelation treatment was incubated at 40° C. for 20 hours.

(3) Pulverizing Treatment and Addition of Photobase Generating Catalyst

Subsequently, the gelled silicon compound that had been subjected to the aging treatment was granulated into pieces of several millimeters to several centimeters using a spatula. 40 g of IPA was added thereto, the mixture was stirred lightly and then was allowed to stand still at room temperature for 6 hours, and a solvent and a catalyst in the gel were decanted. This decantation treatment was repeated three times, and the solvent replacement was completed. Then, the gelled silicon compound in the mixture was subjected to high pressure media-less pulverization. This pulverizing treatment was carried out using a homogenizer (product of SMT Corporation, product name: UH-50) as follows. That is, 1.18 g of gel and 1.14 g of IPA were added to 5 cc screw bottle and pulverized for 2 minutes at 50 W and 20 kHz.

The gelled silicon compound in the mixture was pulverized by the pulverizing treatment, whereby the mixture was changed to a sol particle liquid of the pulverized product. The volume average particle size showing particle size variations of the pulverized products contained in the mixture measured by a dynamic light scattering nanotrac particle size analyzer (product of NIKKISO CO., LTD., product name: UPA-EX150) was 0.50 to 0.70. 0.031 g of IPA (isopropyl alcohol) solution of 1.5 wt % photobase generator (Wako Pure Chemical Industries, Ltd., product name: WPBG266, a substance (a crosslinking reaction accelerator) that generates a catalyst by light irradiation) was added to 0.75 g of the sol particle liquid, thereby preparing a coating liquid. Note that the steps (1) to (3) correspond to the "microporous particle-containing liquid preparation step" of preparing the microporous particle-containing liquid in the production method of the laminated film of the present invention.

(4) Formation of Coating Film and Silicone Porous Body Roll

The surface of a base (a resin film, length: 100 m) made of polyethylene terephthalate (PET) was coated with the coating liquid by bar coating, thereby forming a coating film (coating step). 6 µL of the sol particle liquid was applied to per square millimeter of the surface of the base. The coating film was dried at 100° C. for 1 minute to form a silicone porous body film having a thickness of 1 µm (drying step). The porous body film after drying was irradiated with UV light (precursor forming step). The accumulated light amount in the UV irradiation was 350 mJ/cm$^2$ in terms of the wavelength at 360 nm. Then, the precursor was subjected to the thermal aging at 60° C. for 20 hours, thereby obtaining a low refractive index film (void-provided layer) having a high film strength.

Comparative Example

A laminated film roll in which a low refractive index film (void-provided layer) is stacked on a resin film was obtained in the same manner as in Example 1 except that only UV treatment was performed (thermal aging was not performed) after formation of a silicone porous body film.

Example 2

A laminated film roll in which a low refractive index film (void-provided layer) is stacked on a resin film was produced in the same manner as in Example 1 except that 0.018 g of 5 wt % bis(trimethoxysilyl) ethane was added to 0.75 g of the sol liquid after addition of the photobase generating catalyst solution to adjust the coating liquid in the "(3) Pulverizing treatment and addition of photobase generating catalyst" step of Example 1.

Example 3

A laminated film roll in which a low refractive index film (void-provided layer) is stacked on a resin film was produced in the same manner as in Example 1 except that the amount of the photobase generating catalyst added to 0.75 g of the sol liquid was 0.054g in the "(3) Pulverizing treatment and addition of photobase generating catalyst" step of Example 1.

Example 4

A laminated film roll in which a low refractive index film (void-provided layer) is stacked on a resin film was produced in the same manner as in Example 2 except that 5 wt % 1,6-bis(trimethoxysilyl)hexane (product name: KBM3066, product of Shin-Etsu Chemical Co., Ltd.) was used instead of bis(trimethoxysilyl)ethane of Example 2.

The results thereof are summarized in Table 1. The refractive index, peel strength, haze, and abrasion resistance were measured by the aforementioned method. The abrasion resistance was evaluated as good, fair, or not good. As to the storage stability, the coating liquid was allowed to stand for one week at room temperature and the change in the coating liquid was visually observed.

TABLE 1

|  | Ex. 1 | Comp. Ex. | Ex. 2 | Ex. 3 | Ex. 4 |
|---|---|---|---|---|---|
| Refractive index | 1.14 | 1.15 | 1.15 | 1.16 | 1.17 |
| Peel strength | 1.0N/25 mm | 0.2N/25 mm | 1.2N/25 mm | 1.1N/25 mm | 1.2N/25 mm |
| Storage stability | Good No change in 1 week | Good No change in 1 week | Good No change in 1 week | Good No change in 1 week | Good No change in 1 week |
| Haze | 0.4 | 0.4 | 0.4 | 0.4 | 0.4 |
| Abrasion resistance | Good | Not good | Good | Good | Good |

As summarized in Table 1, Examples 1 to 4, in each of which the strength improving step (aging step) was performed (i.e., crosslinking reaction step had multiple stages), each showed a peel strength and an abrasion resistance higher than those of Comparative Example in which the strength improving step (aging step) was not performed (i.e., crosslinking reaction step had one stage). Examples 1 to 4 each maintained a very low refractive index from 1.14 to 1.17, which is not greatly different from that of Comparative Example. This shows that the laminated films of Examples achieved both a high proportion of void space and a high film strength. Furthermore, since the laminated films of Examples 1 to 4 each maintained a very low haze value of 0.4, which is the same as that of Comparative Example, it was confirmed that the laminated films of Examples 1 to 4 each maintain a transparency equivalent to that of Comparative Example. Since each of the coating liquids of Examples 1 to 4 showed superior storage stability, it was confirmed that a laminated film of stable quality can be produced efficiently in Examples 1 to 4.

INDUSTRIAL APPLICABILITY

As described above, the present invention can provide a production method of a laminated film that achieves both a high proportion of void space and a high film strength, a laminated film, an optical element, and an image display. Owing to the aforementioned properties, the laminated film of the present invention easily achieves a low refractive index, which can be a substitute for an air layer, for example. Thus, there is no need to provide air layers by disposing components at regular spacings for achieving a low refractive index. By disposing the laminated film of the present invention at a desired site, a low refractive index can be imparted. Thus, the laminated film of the present invention is useful for an optical element which requires a low refractive index, for example. The laminated film of the present invention may be used for an optical element and an image display of the present invention, for example. The present invention, however, is not limited thereto and can be used for any purpose.

EXPLANATION OF REFERENCE NUMERALS 10 base
20 precursor (crosslinked precursor)
20' precursor (dried coating film)
20" sol particle liquid
21 void-provided layer
101 delivery roller
102 coating roller
110 oven zone
111 hot air fan (heating unit)
120 chemical treatment zone
121 lamp (light irradiation unit) or hot air fan (heating unit)
130 crosslinking reaction zone
131 hot air fan (heating unit)
105 winding roller
106 roller
201 delivery roller
202 liquid reservoir
203 doctor (doctor knife)
204 micro-gravure
210 oven zone
211 heating unit
220 chemical treatment zone
221 light irradiation unit or heating unit
230 crosslinking reaction zone
231 hot air fan (heating unit)
241 winding roller

The invention claimed is:

1. A method of producing a laminated film, the laminated film comprising:
   a void-provided layer; and
   a resin film, the void-provided layer being stacked on the resin film, wherein
   the method comprising steps of:
   forming a void-provided structure, which is a precursor of the void-provided layer, on the resin film; and
   causing a multiple stage crosslinking reaction in the precursor after the precursor forming step, wherein
   the precursor contains a pulverized product of a gelled silicon compound that are chemically bonded in the multiple stage crosslinking reaction, the multiple stage crosslinking reaction is a crosslinking reaction of the pulverized products, and a substance that generates a crosslinking reaction accelerator for accelerating the multiple stage crosslinking reaction,
   the substance is a substance that generates the crosslinking reaction accelerator by light irradiation or heating,
   the crosslinking reaction accelerator is not generated in the precursor forming step, and the crosslinking reaction accelerator is generated by light irradiation or heating at least one stage of the multiple stage crosslinking reaction.

2. The method according to claim 1, wherein
   the crosslinking accelerator contains an acidic substance or a basic substance,
   the acidic substance or the basic substance is not generated in the precursor forming step, and
   the acidic substance or the basic substance is generated by light irradiation or heating in the multiple stage crosslinking reaction step.

3. The method according to claim 2, wherein
   the multiple stage crosslinking reaction step comprising at least a first stage crosslinking reaction step and a second stage crosslinking reaction step, the multiple stage crosslinking reaction is caused in the precursor by heating the precursor at least from the second stage crosslinking reaction step.

4. The method according to claim 2, wherein
   the multiple stage crosslinking reaction step comprising at least a first stage crosslinking reaction step and a second stage crosslinking reaction step, the strength of the void-provided layer is further improved at least from the second stage crosslinking reaction step.

5. The method according to claim 1, wherein
the multiple stage crosslinking reaction step comprising at least a first stage crosslinking reaction step and a second stage crosslinking reaction step, the multiple stage crosslinking reaction is caused in the precursor by heating the precursor at least from the second stage crosslinking reaction step.

6. The method according to claim 1, wherein
the multiple stage crosslinking reaction step comprising at least a first stage crosslinking reaction step and a second stage crosslinking reaction step, the strength of the void-provided layer is further improved at least from the second stage crosslinking reaction step.

7. The method according to claim 1, wherein
the multiple stage crosslinking reaction step comprising at least a first stage crosslinking reaction step and a second stage crosslinking reaction step, the peel strength of the void-provided layer to the resin film is further improved at least from the second stage crosslinking reaction step.

8. The method according to claim 1, wherein a refractive index of the void-provided layer is not more than a numerical value obtained by adding 0.1 to a refractive index of the precursor.

9. The method according to claim 1, wherein
the void-provided layer is formed so as to have a refractive index of 1.25 or less.

10. The method according to claim 1, wherein
the void-provided layer is formed so as to have a proportion of void space of 40 vol % or more.

11. The method according to claim 1, wherein
the void-provided layer is formed so as to have a thickness in a range from 0.01 µm to 100 µm.

12. The method according to claim 1, wherein
the void-provided layer is formed so as to have a haze value of less than 5%.

13. The method according to claim 1, wherein
the void-provided layer includes a part where one kind or two or more kinds of structural units that form a structure with minute void spaces are chemically bonded directly or indirectly, and
the void-provided layer including a part where the structural units are indirectly bonded by a crosslinking assisting agent for indirectly bonding the structural units is formed.

14. The method according to claim 13, wherein
a content of the crosslinking assisting agent in the void-provided layer relative to a weight of the structural units is in a range from 0.01 wt % to 20 wt %.

15. The method according to claim 1, wherein
the resin film is a continuous resin film, and a precursor layer and the void-provided layer are continuously formed on the continuous resin film.

* * * * *